United States Patent [19]
Kuwahara

[11] Patent Number: 5,317,420
[45] Date of Patent: May 31, 1994

[54] NOISE ELIMINATION APPARATUS FOR ELIMINATING NOISE COMPONENTS HAVING A HIGH DENSITY AND A LOW DENSITY

[75] Inventor: Yasuhiro Kuwahara, Osaka, Japan

[73] Assignee: Matsushita Electric Industrial Co., Ltd., Osaka, Japan

[21] Appl. No.: 961,538

[22] Filed: Oct. 15, 1992

[30] Foreign Application Priority Data

Mar. 5, 1992 [JP] Japan .................. 4-047411

[51] Int. Cl.⁵ .............. H04N 1/38; H04N 1/46; H04N 5/213
[52] U.S. Cl. .................. 358/463; 358/465; 358/530; 382/52; 348/667
[58] Field of Search ........... 358/463, 464, 465, 466, 358/467, 448, 452, 462, 447, 75, 80, 167–530; 382/52, 22

[56] References Cited

U.S. PATENT DOCUMENTS 4,506,382 3/1985 Hada et al. ............... 382/54
4,747,156 5/1988 Wahl ....................... 382/54

FOREIGN PATENT DOCUMENTS 1-160173 6/1989 Japan .
3-9487 1/1991 Japan .

*Primary Examiner*—Edward L. Coles, Sr.
*Assistant Examiner*—Scott A. Rogers
*Attorney, Agent, or Firm*—Ratner & Prestia

[57] ABSTRACT

Color image data of which background is removed is converted into monochrome data and noise in the monochrome data is roughly discriminated in a first noise discrimination process. At the same time, the color and density of an attentional pixel, information area including a character or a picture, and others are checked, according to which operations the resulting first noise discrimination data is corrected in a second noise discrimination process. Substitute data is created from the image data of which background is removed according to the first noise discrimination data, and the substitute data substitutes for a pixel regarded as noise in the second noise discrimination process to obtain an image from which noise is eliminated. With the above arrangement, noise having a high density and noise having a size greater than the scanning window are eliminated without receiving influence from the surrounding noise.

17 Claims, 19 Drawing Sheets

NOISE ELIMINATION APPARATUS FOR ELIMINATING NOISE COMPONENTS HAVING A HIGH DENSITY AND A LOW DENSITY

BACKGROUND OF THE INVENTION

1. Field of the Invention

The present invention relates to a noise elimination apparatus for use in an image processing apparatus such as a copying machine or facsimile.

2. Description of the Prior Art

In recent years, noise elimination has been an indispensable scheme for improving an image quality in the field of image processing. Particularly lately, recycle paper has been increasingly used for the protection of environment in the field of image processing of static images in a copying machine, facsimile, and printer, which leads to a growing need for eliminating noise contained in recycle paper. For instance, when a great amount of documents produced with recycle paper is subject to copying, noise contained in the recycle paper is also undesirably copied to result in image quality deterioration. In the above-mentioned case, supposing that a document is copied onto recycle paper, the resulting copy on the recycle paper is destined to have noise approximately doubled. In other words, the more recycle papers mediate in copying, the more noise increases to further deteriorate image quality.

Furthermore, for a variety of reasons other than the noise in recycle paper, noises are included in image data. For instance, dust on a platen cover in a copying machine causes a high-density noise to deteriorate an image quality.

In order to give solution to the above-mentioned problems, there have been several noise eliminating methods of smoothing an image by means of a smoothing filter, removing an isolated pixel by means of a scanning window, and appropriately setting a noise cut level as disclosed in Japanese Patent Laid-Open Publication HEI-1-160173. According to the method disclosed in the Japanese Patent Laid-Open Publication HEI-1-160173, a histogram of an image signal is firstly obtained, and then a hill of the histogram with respect to the background is detected. Thereafter, a background noise cut level is set around a right or left foot portion of the hill on the side of a signal level containing image data to eliminate noise.

According to the conventional method of smoothing an image by means of a smoothing filter, a noise component occupying a great area exerts significant influence on pixels other than an attentional pixel (core pixel for processing), the noise elimination processing cannot be performed effectively and character edges blur.

According to the method of removing an isolated pixel by means of a scanning window, a noise component having a size greater than that of the scanning window cannot be removed and yet necessary pixels may be undesirably eliminated.

According to the method of setting a noise cut level, a noise component which has a density lower than the densities of necessary image components of a document as located on the background of the document is only eliminated. In other words, there is a problem that any noise component of which density is higher than the background noise cut level is not eliminated.

SUMMARY OF THE INVENTION

Accordingly, an essential object of the present invention is to provide a noise elimination apparatus for eliminating a noise component having a high density as well as a noise component having a size greater than the scanning window without eliminating necessary image components nor receiving influence from noises around an attentional pixel while assuring a capability for processing color images.

In order to achieve the above-mentioned objective, the noise elimination apparatus of the present invention comprises: first noise discrimination means for roughly discriminating noise components in image data; information area detection means for detecting an area of necessary image information in the image data; second noise discrimination mean for discriminating substantial noise components according to first noise discrimination data output from the first noise discrimination means and image information area data output from the image information area detection means; substitute data creation means for creating substitute data to be substituted for noise data according to the image data and the first noise discrimination data; and noise substitution means for substituting the substitute data output from the substitute data creation means for the image data according to second noise discrimination data output from the second noise discrimination means.

Furthermore, the noise elimination apparatus comprises any of: level noise extraction means for extracting data having a specified level among the image data; noise classification means for determining whether the image information area data output from the information area detection means is to be ignored or not according to at least either one of the image data and the first noise discrimination data output from the first noise discrimination means; monochrome creation means for creating monochrome data from color image data; color detection means for detecting the color of the color image data; and background color removal means for removing background color from a color image.

According to the noise elimination apparatus of the present invention, firstly a pixel having a property of noise is detected by the first noise discrimination means. At the same time, an area of necessary image information such as a character and picture is detected by the information area detection means. In the second noise discrimination means, among the noise components discriminated by the first noise discrimination means, such noise components as included in the information area of necessary image information are not regarded as noise and excepted from the object of noise elimination. With the above-mentioned arrangement, the first noise discrimination means may employ a noise discrimination method accepting much erroneous discrimination. In the substitute data creation means, there is created substitute data which is substituted for each pixel discriminated as noise by the second noise discrimination means according to the image data and the discrimination result of the first noise discrimination means. Since the discrimination result of the first noise discrimination means is used in the substitute data creation means, the created substitute data is scarcely influenced by noise. The noise substitution means substitutes the substitute data for each pixel discriminated as noise by the second noise discrimination means.

Furthermore, by providing level noise extraction means in the noise elimination apparatus, possible erroneous discrimination of noise is reduced. Among necessary image information, there are punctuation marks and the like which tend to be erroneously discriminated as noise. Such image information usually has a density higher than that of noise. Therefore, by limiting the density level of noise by means of the level noise extraction means and using the extraction result in the second noise discrimination means, possible elimination of the image information such as punctuation marks which tend to be erroneously discriminated as noise can be prevented.

Furthermore, by providing noise classification means in the noise elimination apparatus, it becomes possible to eliminate to some degree noise components in a necessary image information area which cannot be eliminated due to the operation of the information area detection means. When detecting an image information area by the information area detection means, since a certain margin is provided for the area determination, noise existing in the margin cannot be eliminated. Depending on images, the noise existing in the margin may be conspicuous significantly. In order to cope with the above-mentioned phenomenon, by providing noise classification means which determines such noise density value that is not masked (i.e, not regarded as noise and excepted from the object of noise elimination) due to the operation of the information area detection means, the resulting image quality can be improved.

By providing monochrome creation means in the noise elimination apparatus, the apparatus can manage color image data while enabling utilization of a large part of the subsequent processing circuits.

By providing color detection means in the noise discrimination means, possible erroneous discrimination of noise in a color document can be reduced. When converting image data such as a thin color character into monochrome data in the monochrome data creation process, the monochrome data may be regarded as noise in the subsequent processing stages to result in deteriorating the resulting image quality. By limiting the color of noise by means of the color detection means, the monochrome data can be distinguished from the noise color to lead to improving image quality.

By providing background color removal means in the noise elimination apparatus, any noise component having a low density can be eliminated and any noise component having a high density can be easily made conspicuous. Consequently, threshold value adjustment of the other means can be simplified and noise which has been unable to be eliminated due to the background can be easily eliminated.

By constructing the noise elimination apparatus as described above, a noise discrimination method accepting much erroneous discrimination can be used, allowing to discriminate any noise component having a size greater than that of the scanning window as well as any noise component having a high density to be eliminated. Furthermore, since the substitute data is created according to the discrimination result of the first noise discrimination process, the substitute data which is scarcely influenced by noise can be substituted for any noise pixel. By adopting the above method, edges of a character or the like can be prevented from blurring.

Furthermore, noise elimination capable of managing color images can be achieved.

BRIEF DESCRIPTION OF THE DRAWINGS

These and other objects and features of the present invention will become apparent from the following description taken in conjunction with the preferred embodiment thereof with reference to the accompanying drawings, in which.

DESCRIPTION OF THE PREFERRED EMBODIMENTS

The following describes the preferred embodiments of a noise elimination apparatus in accordance with the present invention with reference to the attached drawings.

Figure 1:
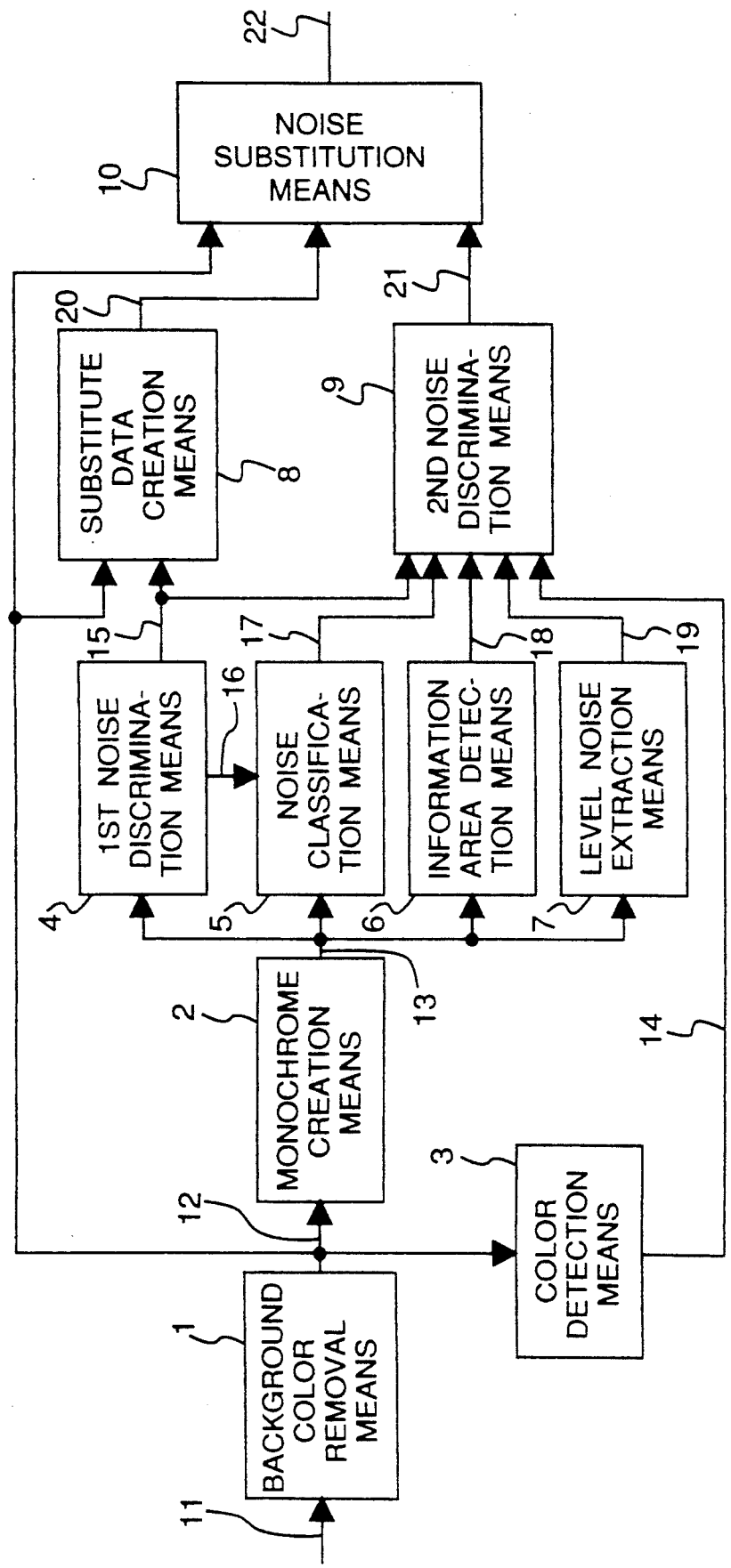
FIG. 1 is a block diagram of a noise elimination apparatus according to a first embodiment of the present invention.

FIG. 1 shows a noise elimination apparatus according to a first embodiment of the present invention (referred to as "first noise elimination apparatus" hereinafter).

The first noise elimination apparatus comprises background color removal means 1, monochrome creation means 2, color detection means 3, first noise discrimination means 4, noise classification means 5, information area detection means 6, level noise extraction means 7, substitute data creation means 8, second noise discrimination means 9, and noise substitution means 10. Since the first noise elimination apparatus has a basic structure similar to that of the seventh noise elimination apparatus, the description thereof will be made after the description of the seventh apparatus.

Figure 2:
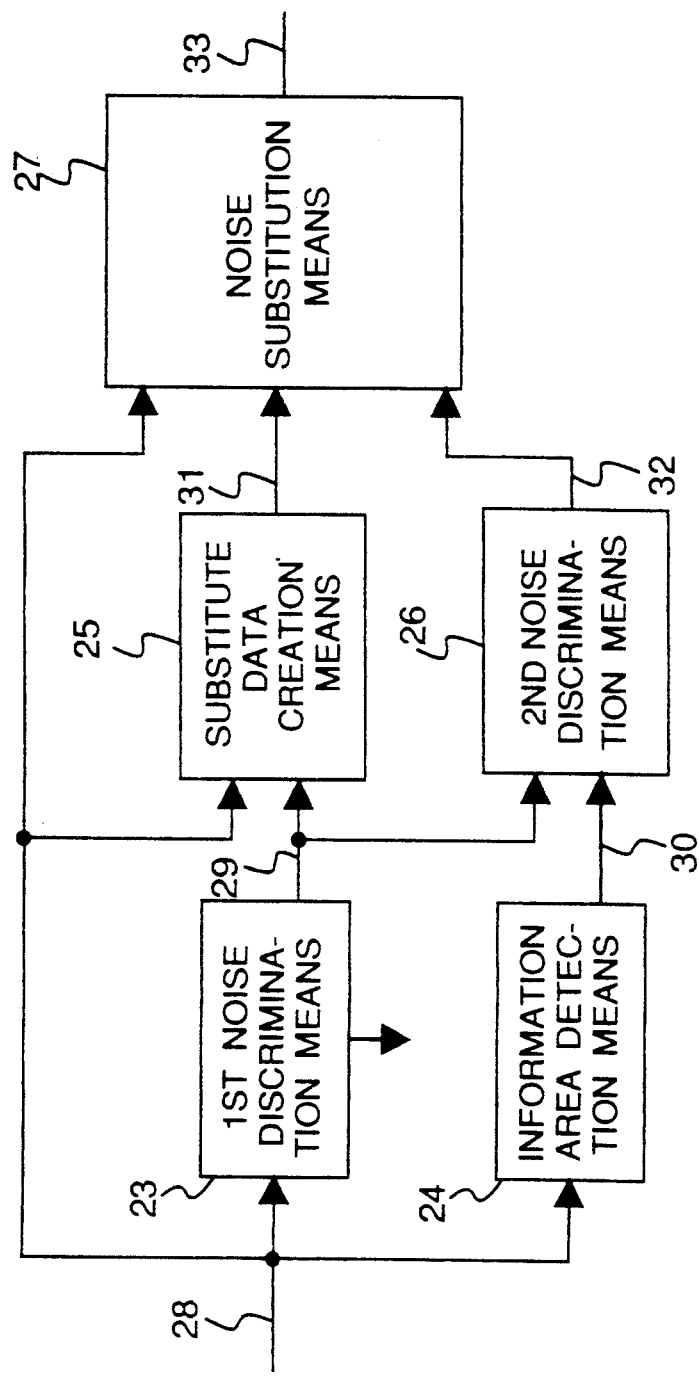
FIG. 2 is a block diagram of a noise elimination apparatus according to a second embodiment of the present invention.

FIG. 2 shows a noise elimination apparatus in accordance with a second embodiment of the present invention (referred to as "second noise elimination apparatus" hereinafter).

The second noise elimination apparatus comprises first noise discrimination means 23, information area detection means 24, substitute data creation means 25, second noise discrimination means 26, and noise substitution means 27.

The following describes the second noise elimination apparatus with reference to FIG. 2.

Image data 28 is input to the first noise discrimination means 23 where noises included in the input image data are roughly discriminated. In this stage, much erroneous discrimination may be accepted and a method for detecting noise components as much as possible. The image data 28 is simultaneously input to the information area detection means 24 where necessary image information such as a character and a picture in the image data is discriminated and the area of the information is detected. First noise discrimination data 29 (noise pixel information) which is detection result made by the first noise discrimination means 23 is partially masked in the second noise discrimination means 26 according to image information area data 30 which is detection result made by the information area detection means 24. In other words, the first noise discrimination data 29 (noise pixel information) existing in the image information area is not discriminated as a noise in the second noise discrimination means 26 no matter whether the data 29 represents noise property. With the above-mentioned arrangement, it is possible to prevent deterioration of image quality due to the noise elimination of necessary data such as a character and picture existing in the image information area.

Meanwhile, the substitute data creation means 25 produces substitute data 31 to be substituted for a noise pixel according to the image data 28 and the first noise discrimination data 29 input to the substitute data creation means 25. Since the first noise discrimination data 29 is used for producing the substitute data 31, any influence due to the noise can be eliminated in creating the substitute data 31. In the noise substitution means 27, the substitute data 31 output from the substitute data creation means 25 is substituted for any pixel information discriminated as a noise among second noise discrimination data 32 output from the second noise discrimination means 26.

With the above-mentioned operations, noise elimination of image data can be performed.

Figure 3A:
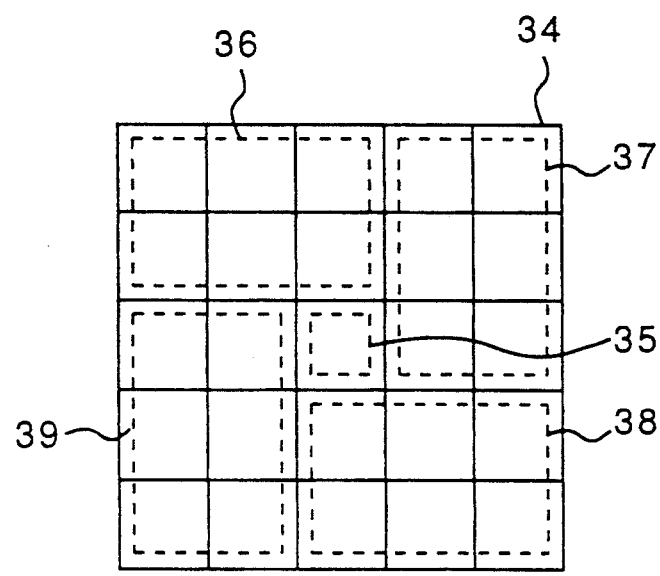
FIGS. 3 (a) and 3 (b) are views for explaining a first noise discrimination method of an embodiment according to the present invention.
Figure 3B:
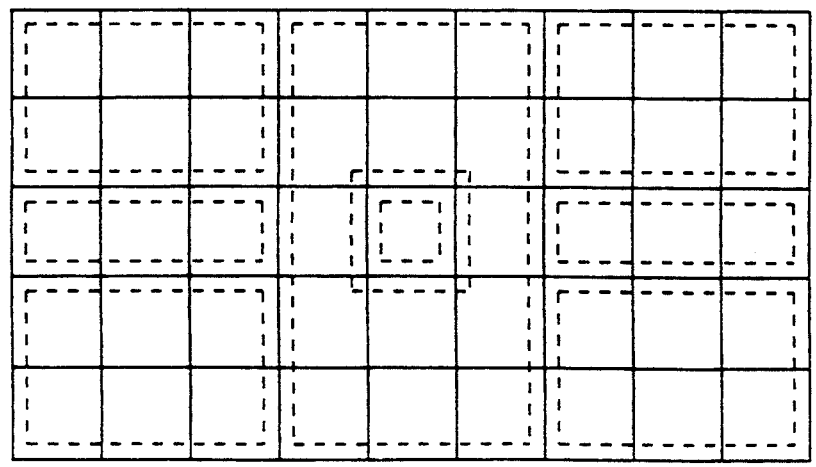

FIGS. 3 (a) and (b) show a first noise discrimination method put into practice by the first noise discrimination means 23.

FIG. 3 (a) shows a first window 34 for scanning image data having, for example, a square size of 25 pixels (5×5 in the horizontal and vertical directions), where the window is divided into five portions consisting of an attentional pixel 35 and four blocks 36, 37, 38, and 39. Firstly, the difference between the level of all of the pixels in the block 36 and the level of the attentional pixel 35 is obtained, and then the amount of pixels of which the difference exceeds a first threshold value is checked. In the same manner, the other blocks 37, 38, and 39 are checked. Then regarding each block where the resulting pixel amount is not smaller than a specified second threshold value, the shape of the block in the window 34 is checked. When the shape of the block coincides with a prescribed first shape, the attentional pixel 35 is discriminated as a noise pixel.

The above-mentioned method can be simplified by preliminarily converting the image data into bi-level data and further adding conditions to the same. It is assumed now that a noise component is a bi-level black pixel, the pixel exceeding the first threshold value is a white pixel, the second threshold value is one pixel, and the prescribed shape is every block. In the first noise discrimination method, when the attentional pixel 35 is a black pixel, it is checked whether a white pixel exist in each of the blocks 36, 37, 38, and 39. When a white pixel exists in each of all the blocks 36, 37, 38, and 39, the attentional pixel 35 is discriminated as noise pixel.

FIG. 3 (b) shows an example where the window size and block division way thereof differ from the case shown in FIG. 3 (a). As obvious from the examples, there are a variety of window size determination and block division ways.

Figure 4:
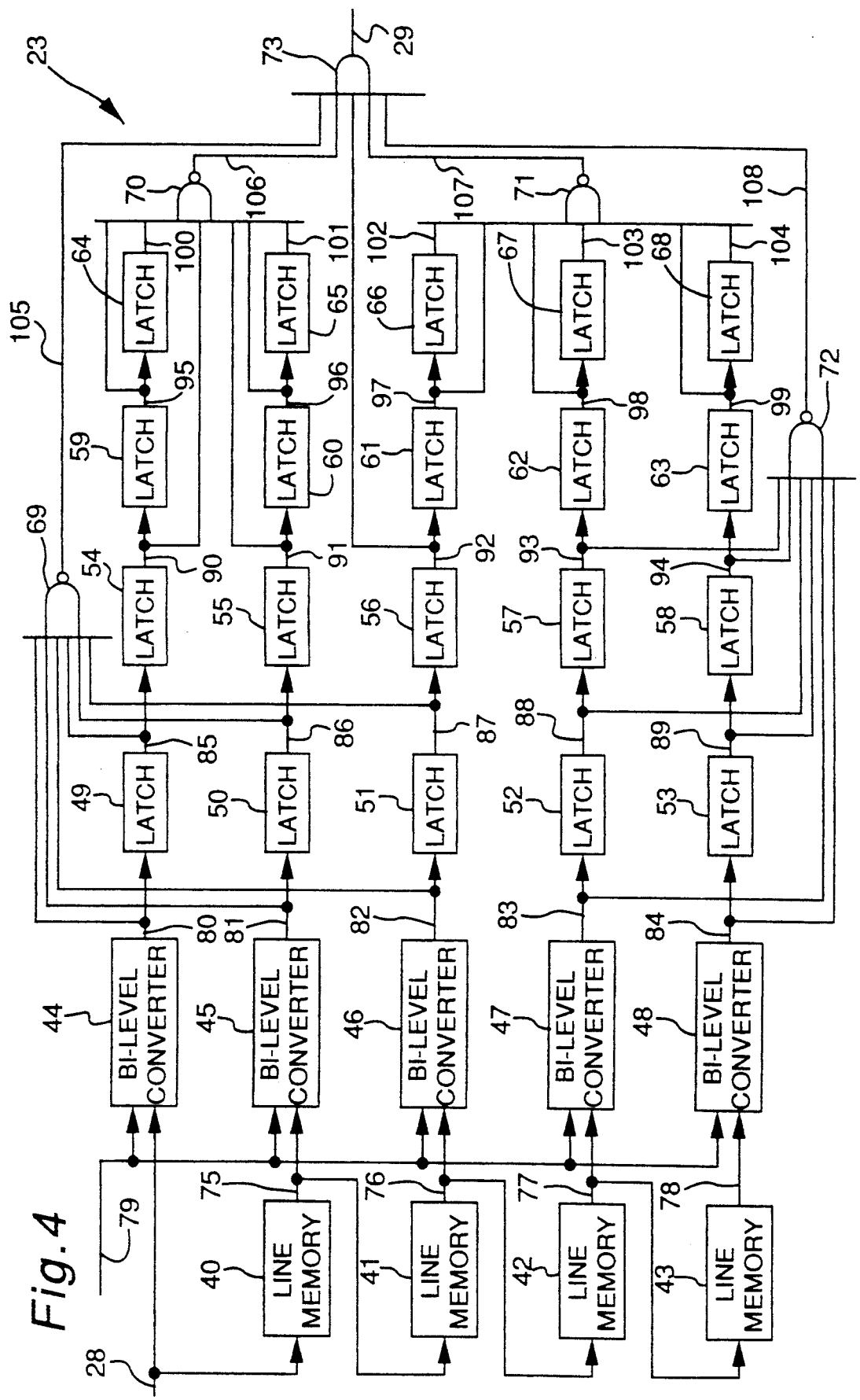
FIG. 4 is a block diagram of a first noise discrimination circuit of an embodiment according to the present invention.

FIG. 4 shows an exemplified circuit arrangement of the first noise discrimination means 23. The first noise discrimination circuit 23 shown in FIG. 4 comprises line memories 40 through 43, bi-level converters 44 through 48, latch units 49 through 68, NAND units 69 through 72, and an AND unit 73.

The following describes the operation of the first noise discrimination circuit 23 with reference to FIG. 4. It is noted that the image data 28 is converted into bi-level data for simplification in the block diagram shown in FIG. 4. It is further noted that no clock line is shown in FIG. 4. First, the image data 28 is input to the line memory 40 and then input to the line memories 41, 42, and 43 in turn each for delaying the image data by one line, which arrangement allows the image data to be processed with a scanning window. Since output data 75 of the line memory 40 is the image data 28 delayed by one line, the output data 75 represents the image data of the previous line of the image data 28 in regard of the flow of image data. In the same manner, output data 76 of the line memory 41 is the image data of the line preceding by two lines. The line memories 42 and 43 operate in the same manner as above to represent respectively data 77 of the line preceding by three lines and data 78 of the line preceding by four lines.

The image data 28 is input to the bi-level converter 44 simultaneously with input to the line memory 40 to be compared with a threshold value 79 to be converted into bi-level data. The bi-level converter can be easily constructed by a comparator. For instance, the bi-level converter 44 is preferably constructed to compare the input data 28 with the threshold value 79 to output a high-level signal to a signal line 80 when the input data 28 is greater than the threshold value 79 or output a low-level signal to the signal line 80 when the input data 28 is not greater than the threshold value 79. The delayed image data 75, 76, 77, and 78 are also converted into bi-level data through the bi-level converters 45 to 48 respectively in the same manner. The binary data 80 output from the bi-level converter 44 is held in the latch 49. The latch units 49 through 68 are each for delaying bi-level image data by one pixel. Therefore, with the construction as shown in FIG. 4, a first scanning window can be formed. It is noted in the present case that the attentional pixel data is represented by output data 92 of the latch 56.

An assembly of data input to each of the NAND gates 69 through 72 corresponds to an assembly of pixel data of each divided block. Therefore, four divided blocks are included in the example shown in FIG. 4.

The following describes the operation of the NAND gates by taking the NAND gate 70 as an example. It is noted in the present embodiment that, among the pixels converted into bi-level data, the black pixel is represented by a high-level signal, the white pixel is represented by a low-level signal, and the noise pixel is represented by the high-level signal.

In order to make the NAND gate 70 output a high-level signal 106, at least one of the input data 90, 91, 95, 96, 100, and 101 thereof must be a low-level signal. In other words, when at least one white pixel exists in the block, the NAND gate 70 outputs the high-level signal 106. In the same manner, the NAND gates 69, 71, and 72 output high-level signals 105, 107, and 108 when at least one white pixel exists in the corresponding block.

In order to make the AND gate 73 output a high-level signal 29, all the four NAND gates 69, 70, 71, and 72 output high-level signals and the attentional pixel data 92 is a high-level signal. In the above-mentioned case, the attentional pixel is discriminated as a noise pixel.

Although only one first noise discrimination data is output in the embodiment shown in FIG. 4, any shape of the first noise discrimination data can be set up in the window by appropriately combining the input signals and elements other than the AND gate 73.

Figure 5:
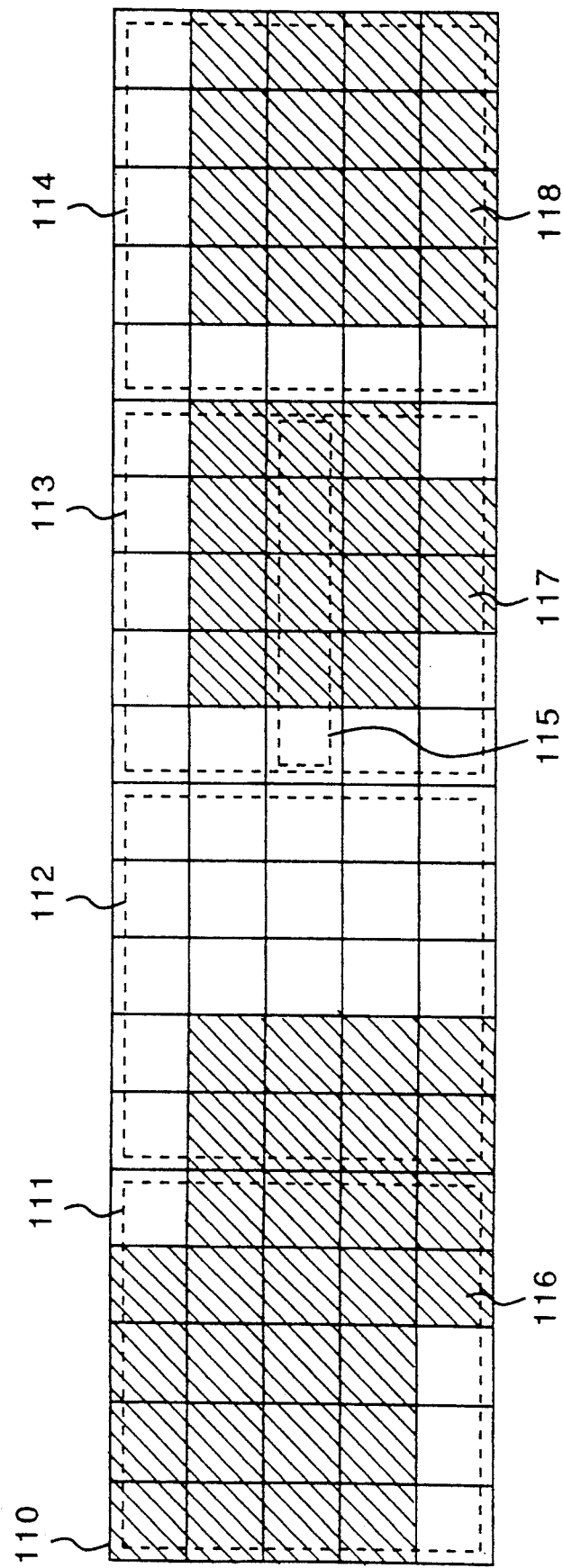
FIG. 5 is a view for explaining an image information area detection method of an embodiment according to the present invention.

FIG. 5 shows a view for explaining the information area detection method carried out by the information area detection means 24.

A second scanning window 110 is divided into four blocks 111, 112, 113, and 114 as shown in FIG. 5. It is noted that the present scanning window scans the image data in a unit of five pixels. Therefore, when the attentional pixel is in an area 115 enclosed by dotted lines, the second scanning window stands still.

First, it is checked how many pixels exceeding a prescribed third threshold value exist in the blocks 111, 112, 113, and 114. It is now assumed that areas 116, 117, and 118 indicated in hatched areas shown in FIG. 5 exceed the third threshold value. Then the amount of the pixels exceeding the third threshold obtained for each of the blocks 111, 112, 113, and 114 is compared with a fourth threshold value. Assuming that the fourth threshold value is twelve (pixels), the block 111 (having 21 exceeding pixels), block 113 (having 14 exceeding pixels), and block 114 (having 16 exceeding pixels) satisfy the above-mentioned condition. Lastly, it is checked whether each obtained block arrangement coincides with a prescribed second shape. In the present case, assuming that the second shape corresponds to a group including at least two of the four blocks 111, 112, 113, and 114, the example shown in FIG. 5 satisfies the condition of the image information area. In other words, all the attentional pixels existing in the area 115 are included in the image information area so that the attentional pixels in the area 115 are excepted from the object of noise elimination.

It is noted that the size of the second scanning window and the way of block division is not limited to the example shown in FIG. 5.

Figure 6:
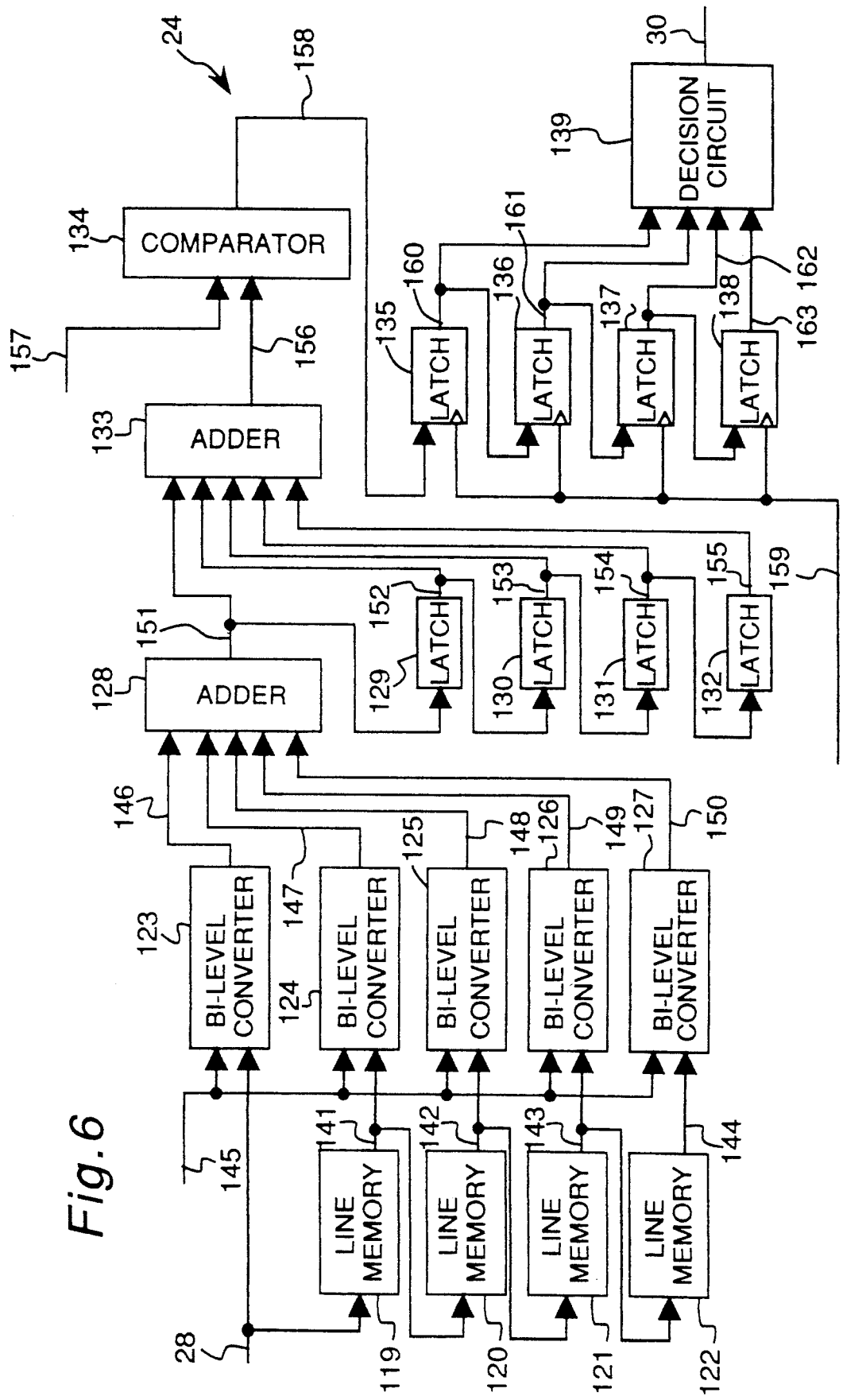
FIG. 6 is a block diagram of an image information area detection circuit of an embodiment according to the present invention.

FIG. 6 shows an exemplified circuit arrangement of the information area detection means 24 shown in FIG. 2.

Referring to FIG. 6, the information area detection circuit 24 comprises line memories 119 through 122, bi-level converters 123 through 127, adders 128 and 133, latch units 129 through 132 and 135 through 138, a comparator 134, and a decision circuit 139.

The following describes the operation of the information area detection circuit 24 with reference to FIG. 6. Image data 28 is delayed by means of the line memories 119 through 122 and the data corresponding to five lines are simultaneously processed. The image data 28 is also input to the bi-level converter 123 where the input image data 28 is compared with a prescribed third threshold (indicated by numeral 145) so that the image data is converted into bi-level data 146. In the same manner, output data 141 through 144 of the line memories 119 through 122 are input respectively to the bi-level converters 124 through 127 where the input data are converted into bi-level data by comparing the input data with the threshold 145. All the output data 146 through 150 of the bi-level converters 123 through 127 are added up in the adder 128. Output data 151 of the adder 128 is delayed by means of the latch units 129 through 132, and the output data 151 and output data 152 through 155 of the latch units 129 through 132 are added together in the adder 133. Output data 156 of the adder 133 corresponds to the amount of pixels exceeding the third threshold in a block of vertical five pixels by horizontal five pixels. The output 156 of the adder 133 is compared with a prescribed fourth threshold 157 in the comparator 134 to output the compared result to a signal line 158. The latch 135 stores the output data 158 of the comparator 134 in synchronization with a synchronizing signal 159 which is input to the latch 135 every five pixels. In the same manner, the latch units 136 through 138 store output data 160 through 162 of the latch units 135 through 137 respectively every five pixels. The decision circuit 139 judges whether the attentional pixel data (not shown) exists in an information area according to the output data 160 through 163 of the latch units 135 through 138 so that the resultant judgment is output to an output line 30.

Figure 7:
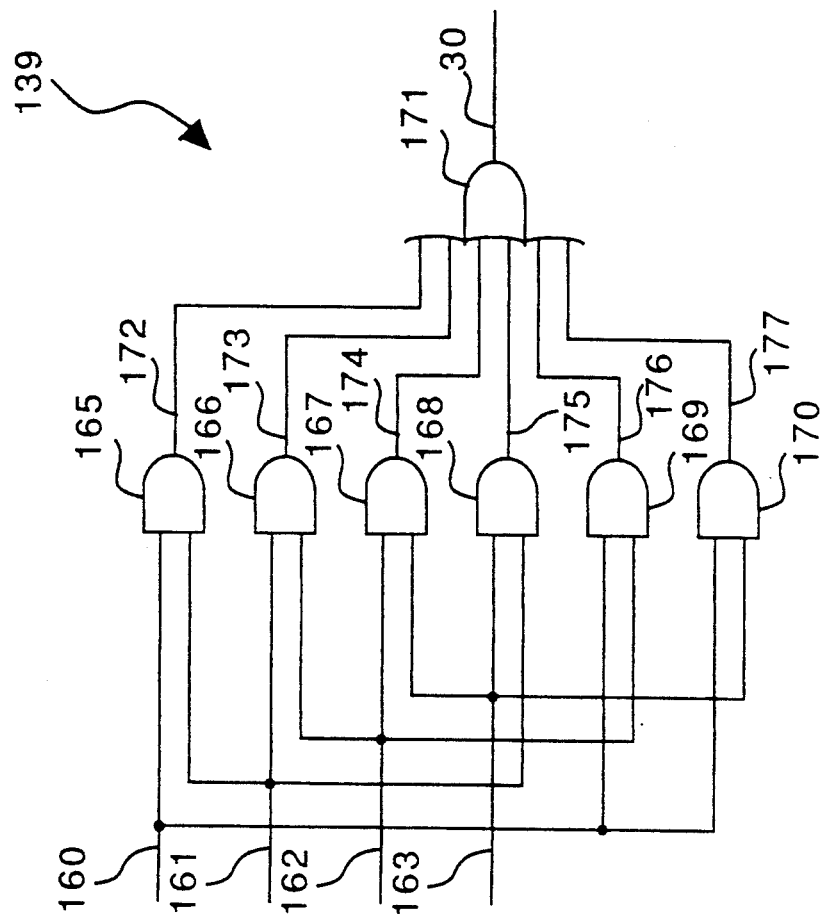
FIG. 7 is a circuit diagram of a judgment circuit in the image information area detection circuit of an embodiment according to the present invention.
Figure 8A:
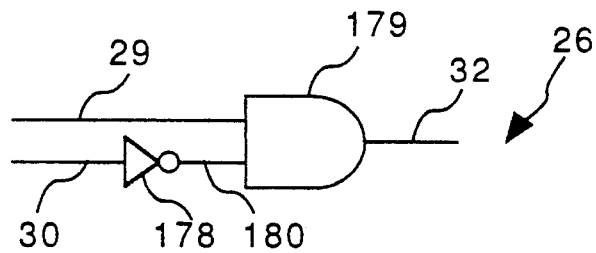
FIGS. 8 (a), 8 (b), 8 (c), 8 (d) and 8 (e) are circuit diagrams of a second noise discrimination circuit of an embodiment according to the present invention.
Figure 8B:
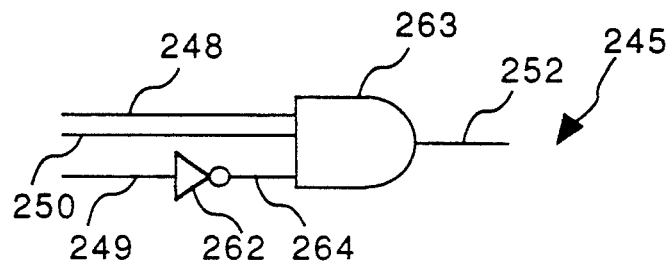
Figure 8C:
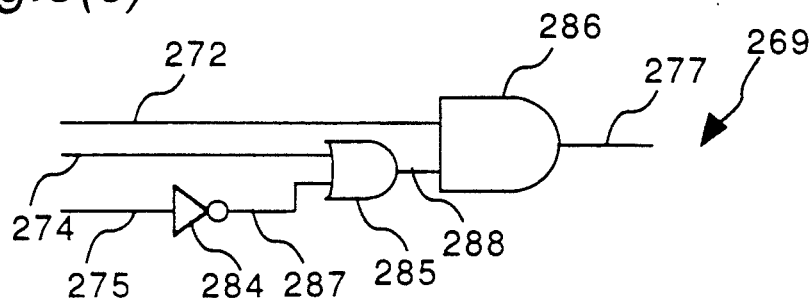
Figure 8D:
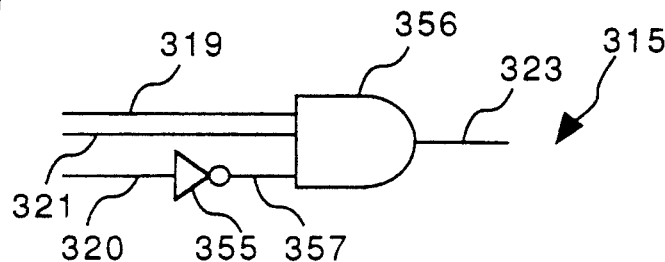
Figure 8E:
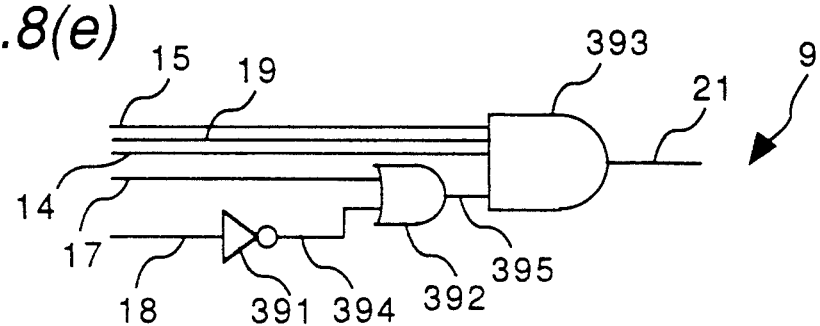

FIG. 7 shows an example of the decision circuit 139 shown in FIG. 6. The decision circuit 139 shown in FIG. 7 comprises AND gates 165 through 170 and an OR gate 171. At least two of the input data 160 through 163 represent the high level, at least one of the AND gates outputs a high level signal. Consequently, the OR gate 171 outputs a high-level signal to the signal line 30.

When the signal line 30 represents the high level, it is judged that the attentional pixel exists in an image information area.

FIG. 8 (a) shows an executed example of a circuit arrangement of the second noise discrimination means 26.

The second noise discrimination circuit 26 shown in FIG. 8 (a) comprises a NOT element (inverter) 178 and an AND element 179. The first noise discrimination data 29 output from the first noise discrimination circuit 23 is input to the AND element 179, while the image information area data 30 output from the information area detection circuit 24 is inverted by the NOT element 178 and the inverted data is input to the AND element 179. When the attentional pixel is included in the image information area, the image information area data 30 is a high-level signal, and therefore the NOT element 178 outputs a low-level signal to a signal line 180. Therefore, when the attentional pixel is included in the image information area, the AND element 179 continuously outputs a low-level signal to the signal line 32. When the attentional pixel is not included in the image information area, the first noise discrimination data 29 per se is output. In the above-mentioned manner, the second noise discrimination operation is performed to output the second noise discrimination data 32.

Figure 9A:
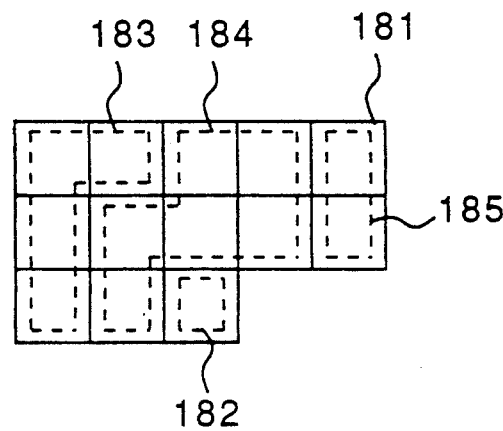
FIGS. 9 (a) and 9 (b) are views for explaining a method of producing substitute data of an embodiment according to the present invention.
Figure 9B:
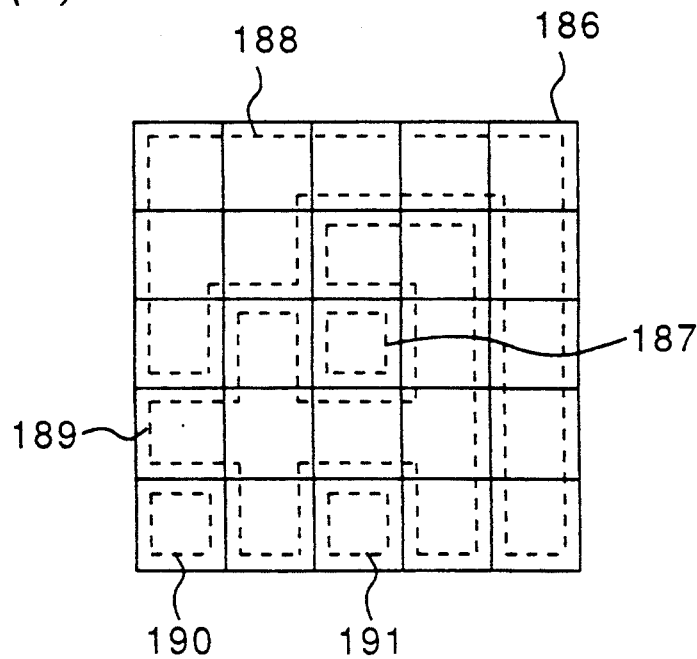

FIGS. 9 (a) and 9 (b) show views for explaining a substitute data creating method practiced by the substitute data creation means 25.

It is now assumed that twenty five pixels in a square window 186 shown in FIG. 9 (b) can be classified into five areas consisting of an attentional pixel 187 enclosed by the dotted line, a noise pixel area 189, and normal image pixel areas 188, 190, and 191. In the case where the attentional pixel 187 is a noise pixel, when the substitute data is produced with the pixels in the window 186, merely averaging the peripheral pixels results in exertion of great influence from the noise pixel area 189. Therefore, it is desired to create substitute data with the pixels in the window 186 excluding the pixels included in the noise pixel area 189 (i.e., using the pixels in the areas 188, 190, and 191). Therefore, the first noise discrimination data 29 is used for creating the substitute data.

The reason the window 181 shown in FIG. 9 (a) is not square is that this arrangement corresponds to the case where the first noise discrimination data 29 includes the data of only the pixels preceding the attentional pixel 182. In the case of FIG. 9 (a), assuming that an area 184 is a noise pixel area and areas 183 and 185 are normal image pixel areas, it is obvious that substitute data is not permitted to be created merely from an average of the peripheral pixels around the attentional pixel 182.

Figure 10:
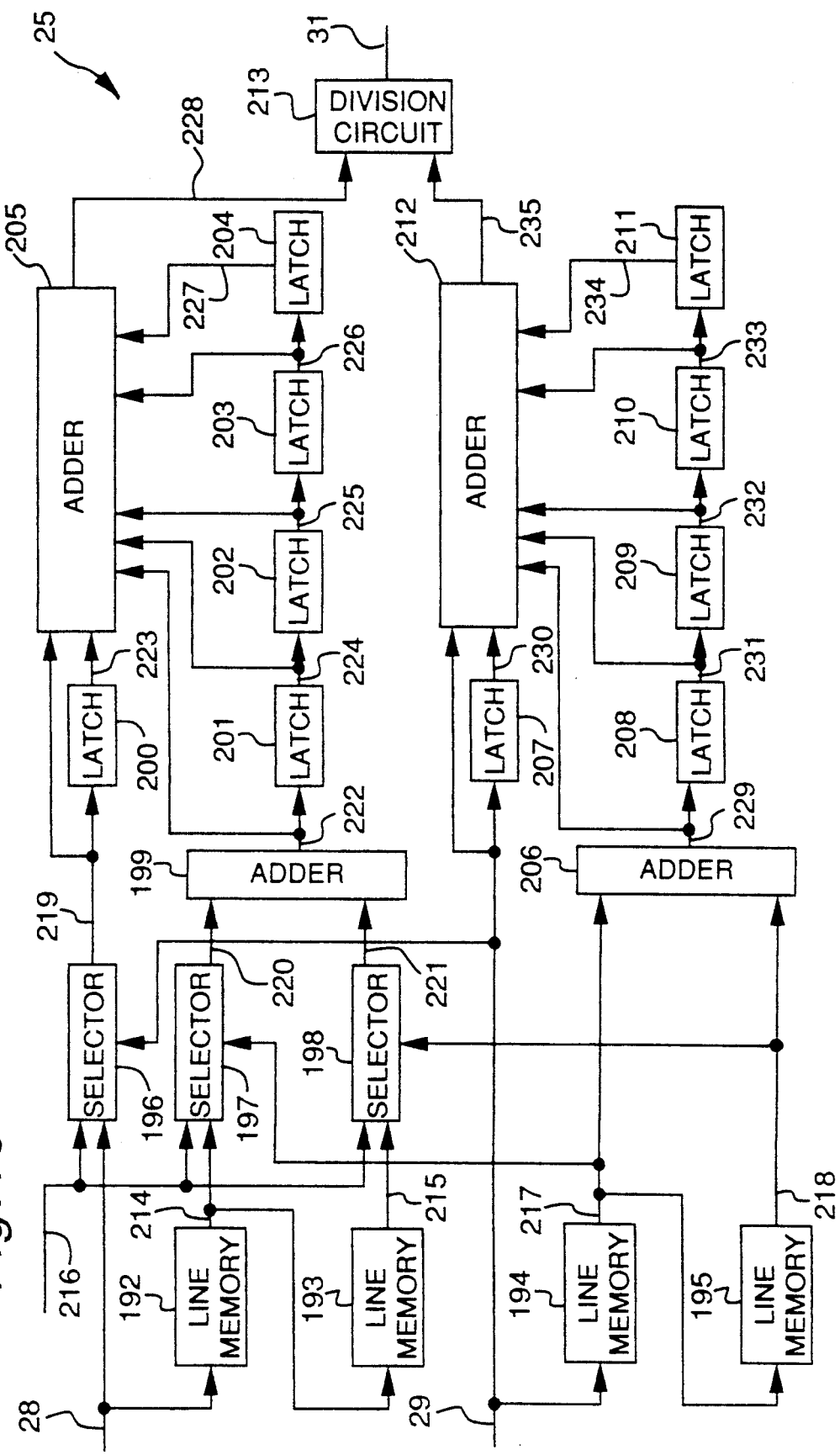
FIG. 10 is a block diagram of a substitute data creation circuit of an embodiment according to the present invention.

FIG. 10 shows an example of a circuit arrangement of the substitute data creation means 25 shown in FIG. 2.

Referring to FIG. 10, the substitute data creation circuit 25 comprises line memories 192 through 195, selectors 196 through 198, adders 199, 205, 206, and 212, latch units 200 through 211, and a division circuit 213.

The substitute data 31 is produced using the window as shown in FIG. 9 (a). First, the image data 28 is input to the line memories 192 and 193 to allow data of three lines to be processed at the sam time. The image data 28 and delayed image data 214 and 215 are input respectively to the selectors 196, 197, and 198. The selectors 196, 197, and 198 are also supplied with an input signal having a value "0" via a signal line 216.

Meanwhile, the first noise discrimination data 29 output from the first noise discrimination means 23 is input to the line memories 194 and 195 to simultaneously process the data corresponding to three lines. The first noise discrimination data 29 and the delayed first noise discrimination data 217 and 218 are input respectively to the selectors 196, 197, and 198 to be treated as selection signals. When the first noise discrimination data 29 is a high-level signal (corresponding to discrimination of noise), the selector 196 selects the value "0". When the first noise discrimination data 29 is a low-level signal, the selector 196 selects the image data 28. The same operations are performed in the selectors 197 and 198. In other words, when the image data 28 is discriminated as noise by the first noise discrimination means 23, the selectors 196, 197, and 198 do not select the image data 28, 214, nor 215 but produce the signal of value "0".

The output data 219 of the selector 196 is input to the latch 200. Output data 220 and 221 of the selectors 197 and 198 are input to the adder 199 to be added up. The adder 199 is provided for reducing the necessary amount of subsequent latches and others. By means of the latch units 200 through 204, a condition capable of simultaneously processing image data in a window can be assured. In this stage, image data of any noise pixel has been changed to value "0" by the operations of the selectors 196, 197 and 198, with which only non-noise normal image data are added up. The resultant data 228 added up in the adder 205 is input to the division circuit 213.

Meanwhile, the first noise discrimination data 29 and the sum of the delayed first noise discrimination data 217 and 218 are simultaneously processed in the latches 207 through 211. In the adders 206 and 212, the amount of pixels represented by low-level signals (non-noise pixels) is obtained through addition. Data 235 output from the adder 212 is input to the division circuit 213. In the division circuit 213, an average value of the non-noise pixels is obtained by dividing the data 228 by the data 235 to produce the substitute data 31.

With the above-mentioned arrangement, substitute data can be created without receiving any influence from noise. Although the average value of the non-noise pixels is obtained in the embodiment shown in FIG. 10, the substitute data is not limited to the average value. (A median value may be obtained as the substitute data from a histogram of the non-noise pixels.)

Figure 11:
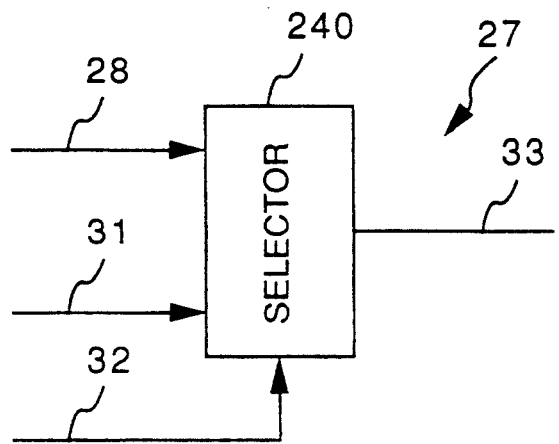
FIG. 11 is a block diagram of a noise substitution circuit of an embodiment according to the present invention.

FIG. 11 shows an example of a noise substitution circuit serving as the noise substitution means 27 shown in FIG. 2.

The noise substitution circuit 27 shown in FIG. 11 comprises a selector 240. The selector 240 selects either the image data 28 or the substitute data 31 created by the substitute data creation circuit 25 according to the second noise discrimination data 32 output from the second noise discrimination circuit 26 so as to output data 33 from which noise is eliminated.

Although only one sort of substitute data is used in the embodiment shown in FIG. 11, by creating several sorts of substitute data 31 in the substitute data creation circuit 25 and creating multi-level noise discrimination data in the second noise discrimination circuit 26, several sorts of substitute data may be selected.

Figure 12:
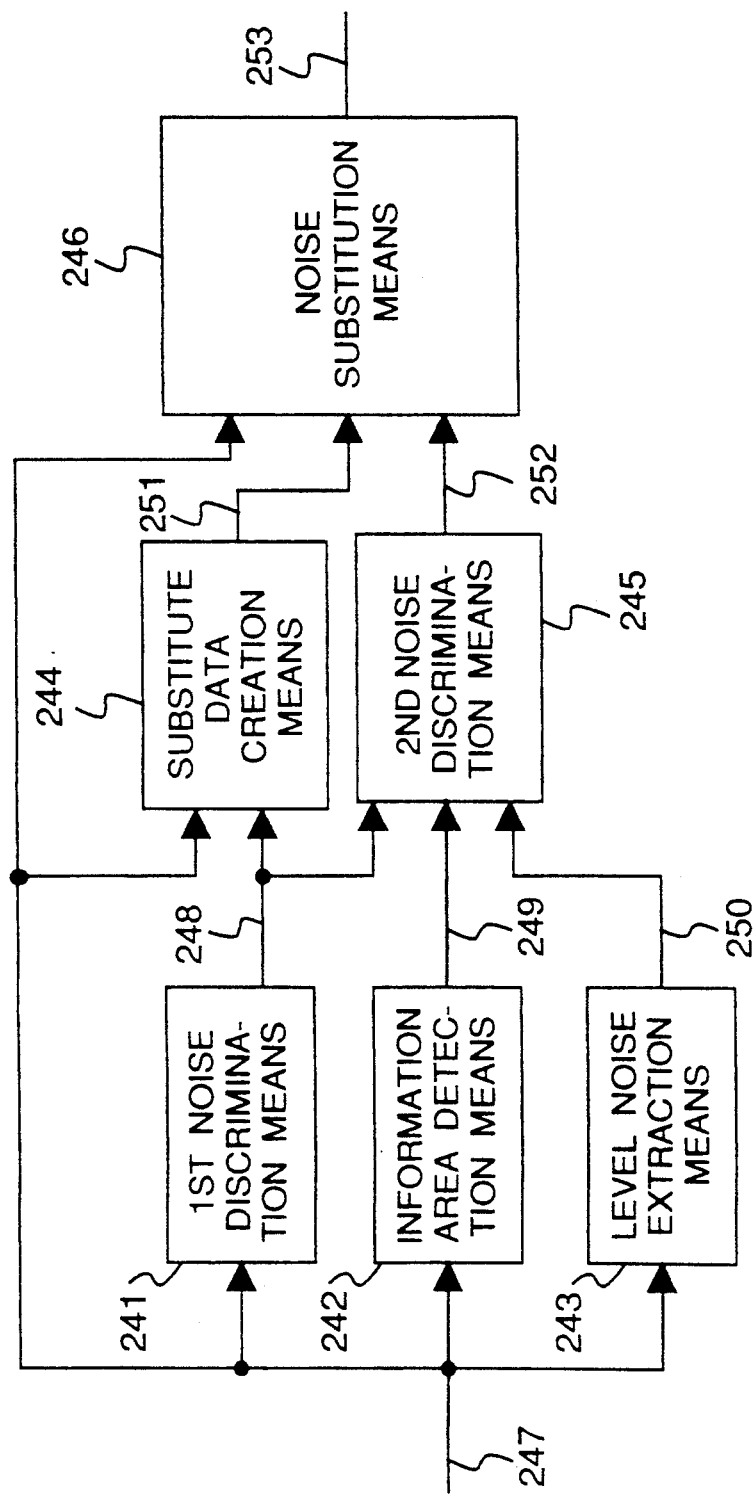
FIG. 12 is a block diagram of a noise elimination apparatus according to a third embodiment of the present invention.

FIG. 12 shows a noise elimination apparatus in accordance with a third embodiment of the present invention (referred to as "third noise elimination apparatus" hereinafter).

The third noise elimination apparatus comprises first noise discrimination means 241, information area detection means 242, level noise extraction means 243, substitute data creation means 244, second noise discrimination means 245, and noise substitution means 246.

The following describes the operation of the third noise elimination apparatus with reference to FIG. 12.

Image data 247 is simultaneously input to the first noise discrimination means 241, information area detection means 242, level noise extraction means 243, substitute data creation means 244 and noise substitute means 246. The first noise discrimination means 241 roughly discriminates a noise in the image data. The information area detection means 242 discriminates necessary image information such as a character and a picture and detects the area of the necessary information. Meanwhile, the level noise extraction means 243 determines the (density) level of the noise to be eliminated. First noise discrimination data 248 (noise pixel information) detected by the first noise discrimination means 241 is partially corrected in the second noise discrimination means 245 according to information area data 249 detected by the information area detection means 242 and level noise extraction data 250 output from the level noise extraction means 243. In other words, when a noise 248 detected by the first noise discrimination means 241 exists in the information area or out of a noise level, the second noise discrimination means 245 determines that the objective data is non-noise no matter whether it is noise.

With the above-mentioned arrangement, it is possible to prevent deterioration of image quality due to elimination of noises in the characters and pictures existing in the information area. By limiting the noise level, it becomes possible to protect necessary image information such as a punctuation mark which tends to be discriminated as a noise. Meanwhile, the substitute data creation means 244 creates substitute data to be substituted for a noise pixel using the input image data 247 and the first noise discrimination data 248 transmitted from the first noise discrimination means 241. By using the first noise discrimination data 248 for creating substitute data, the possible influence from the noise on the substitute data can be eliminated. The noise substitution means 246 substitutes the substitute data 251 output from the substitute data creation means 244 for the pixel data discriminated as a noise among second noise discrimination data 252 output from the second noise discrimination means 245.

With the above-mentioned arrangement, noise elimination of image data can be performed. The third noise elimination apparatus differs from the second noise elimination apparatus chiefly in that the third apparatus has the level noise extraction means 243 which protects necessary image information such as a punctuation mark and a dotted line which tends to be discriminated as a noise, which is very effective when (density) level of image information is sufficiently higher than that of a noise.

In the third noise elimination apparatus, the first noise discrimination means 241, information area detection means 242, substitute data creation means 244, and noise substitution means 246 can be provided by the same circuits as those of the second noise elimination apparatus shown in FIGS. 4, 6, 7, 10, and 11.

Figure 13:
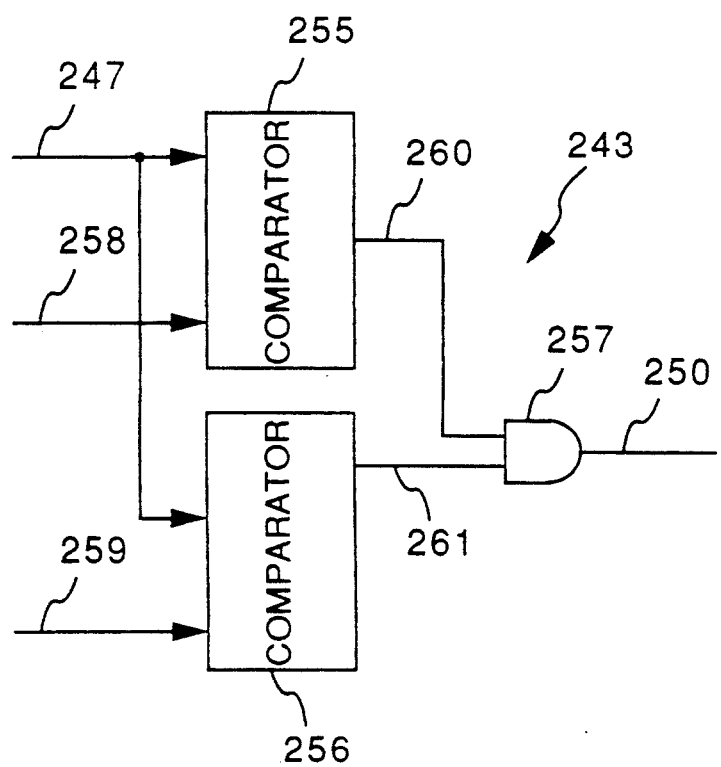
FIG. 13 is a block diagram of a level noise extraction circuit of an embodiment according to the present invention.

FIG. 13 shows an example of a circuit arrangement of the level noise extraction means 243.

The level noise extraction circuit 243 comprises comparators 255 and 256 and an AND element 257. The image data 247 is input to the comparator 255 so as to be compared with a threshold 258 which represents the minimum value of a noise level. When the image data 247 is greater than the threshold 258, the comparator 255 outputs a high-level signal to a signal line 260. Meanwhile, the image data 247 is also input to the comparator 256 so as to be compared with another threshold 259 representing the maximum value of noise level. The comparator 256 outputs a high-level signal to a signal line 261 when the image data 247 is not greater than the threshold 259. The AND element 257 outputs a high-level signal to the signal line 250 when the output signals 260 and 261 of the comparators 255 and 256 are both the high-level signals. In other words, when the image data 247 is greater than the threshold value 258 and not greater than the threshold value 259, the level noise extraction circuit 243 of the third embodiment outputs the high-level signal to the signal line 250 with judgment that the image data 247 exists on or above the noise level.

Although both the maximum and minimum noise levels are provided in the present embodiment, either of the levels may be singly provided.

FIG. 8 (b) shows an example of a circuit arrangement of the second noise discrimination means 245 shown in FIG. 12.

The noise discrimination circuit 245 shown in FIG. 8 (b) comprises a NOT element (inverter) 262 and an AND element 263. The AND element 263 outputs a high-level signal to the signal line 252 when the first noise discrimination data 248 output from the first noise discrimination means 241 represents the high level and the information area data 249 output from the information area detection means 242 represents the low level (in this case, an output signal 264 of the NOT element 262 represents the high level) and the level noise data 250 output from the level noise extraction means 243 represents the high level. In other words, the second noise discrimination circuit 245 of the third embodiment outputs a high-level signal (representing noise) to the signal line 252 when the first noise discrimination means 241 discriminates the object image data as noise while the information area detection means 242 determines that the attentional pixel is not existing in the information area and the level noise extraction means 243 determines that the attentional pixel (data value) is on or above the noise level.

With the above-mentioned arrangement, the third noise elimination apparatus of the present embodiment can perform noise elimination with noise (density) level limited.

Figure 14:
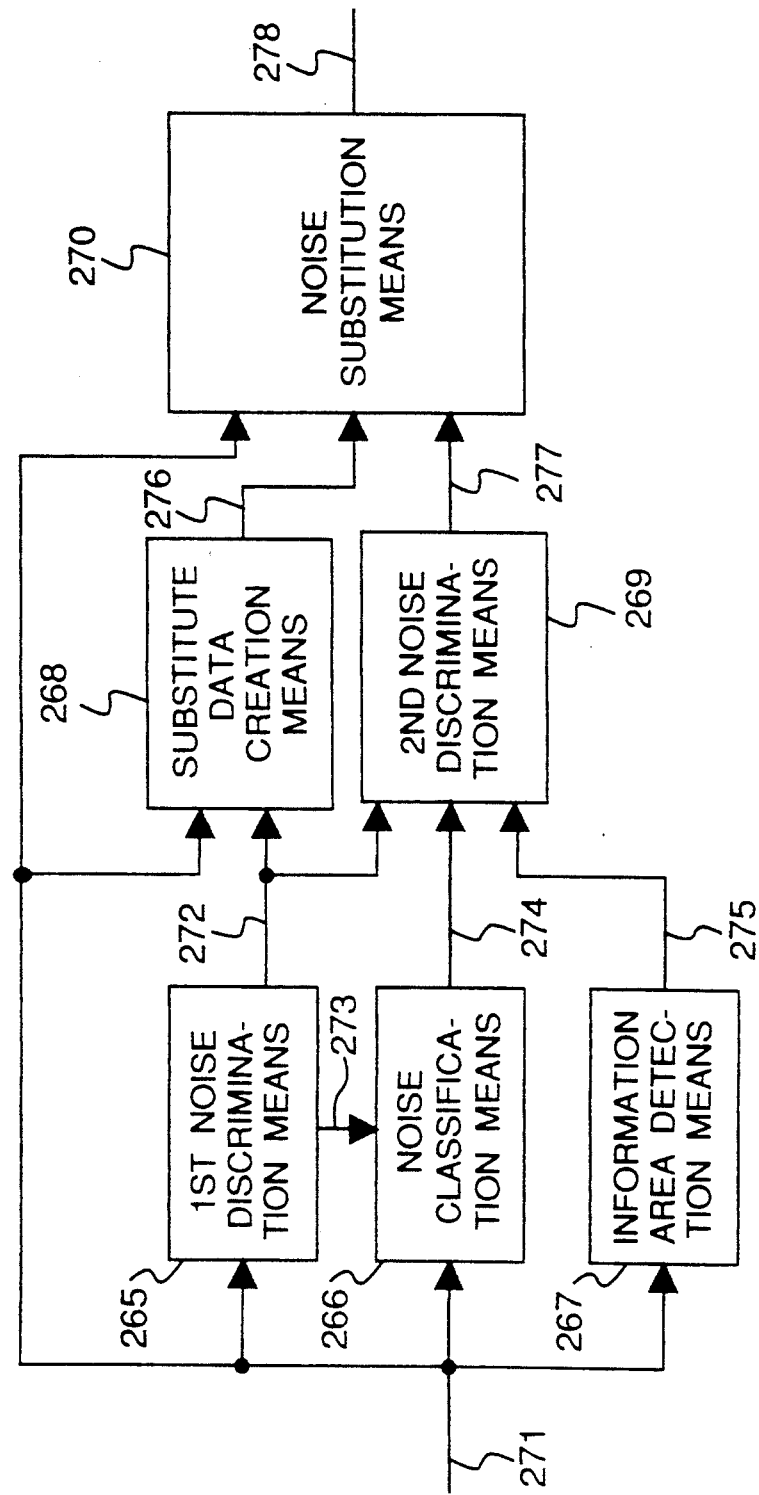
FIG. 14 is a block diagram of a noise elimination apparatus according to a fourth embodiment of the present invention.

FIG. 14 shows a noise elimination apparatus in accordance with a fourth embodiment of the present invention (referred to as "fourth noise elimination apparatus" hereinafter).

Referring to FIG. 14, the fourth noise elimination apparatus comprises first noise discrimination means 265, noise classification means 266, information area detection means 267, substitute data creation means 268, second noise discrimination means 269, and noise substitution means 270.

The following describes the operation of the fourth noise elimination apparatus with reference to FIG. 14.

Image data 271 is simultaneously input to the first noise discrimination means 265, noise classification means 266, information area detection means 267, substitute data creation means 268 and noise substitution means 270 respectively. The first noise discrimination means 265 roughly discriminates a noise contained in the image data 271. The information area detection means 267 discriminates necessary image information such as a character and a picture in the image data and detects the area of the necessary information.

The noise classification means 266 classifies noise data according to the input image data 271 and first noise discrimination data 273 output from the first noise discrimination means 265 thereby to produce noise classification data 274 for determining whether or not image information area data 275 output from the information area detection means 267 is to be masked. First noise discrimination data 272 (noise pixel information) detected by the first noise discrimination means 265 is partially corrected in the second noise discrimination means 269 according to the information area data 275 output from the information area detection means 267 and the noise classification data 274 output from the noise classification means 266. In the second noise discrimination means 269, even when noise data 272 detected in the first noise discrimination means 265 exists in the information area, so long as the noise classification means 266 classifies the object data as noise for nullifying the information area data 275, the second noise discrimination means 269 forms an output representing noise as it is.

Meanwhile, the substitute data creation means 268 creates substitute data to be substituted for a noise pixel data according to the input image data 271 and the first noise discrimination data 272. By using the first noise discrimination data 272 for creating the substitute data, possible influence due to the noise on the substitute data can be eliminated. The noise substitution means 270 substitutes the substitute data 276 output from the substitute data creation means 268 for a pixel data discriminated as noise according to second noise discrimination data 277 transmitted from the second noise discrimination means 269.

With the above-mentioned arrangement, noise elimination of the image data can be performed. The present apparatus according to the fourth embodiment differs from the second noise elimination apparatus shown in FIG. 2 chiefly in that the fourth apparatus has the noise classification means 266, which makes it possible to eliminate to some extent the noise components contained in the image information area which cannot be eliminated due to the information area detection means 267. When detecting an information area by the information area detection means 267, a certain margin is provided. The more the margin increases, the possible erroneous detection of a character or a picture located in the information area reduces in the present noise elimination apparatus. However, noise components existing in the margin cannot be eliminated, which may deteriorate image quality. Therefore, noise components are classified to detect a sort of noise components which may be eliminated even when they are located in the information area. For instance, when a pixel has its density sufficiently smaller than that of image information, there is used a method of ignoring the detection result of the information area detection means 267 for the pixel.

In regard of the fourth noise elimination apparatus, the first noise discrimination means 265, information area detection means 267, substitute data creation means 268, and noise substitution means 270 can be provided by the same circuits as those of the second noise elimination apparatus shown in FIGS. 4, 6, 7, 10, and 11. In the first noise discrimination means 265, the first noise discrimination data 272 and 273 are obtained by a block dividing method and by providing several prescribed first shapes.

Figure 15:
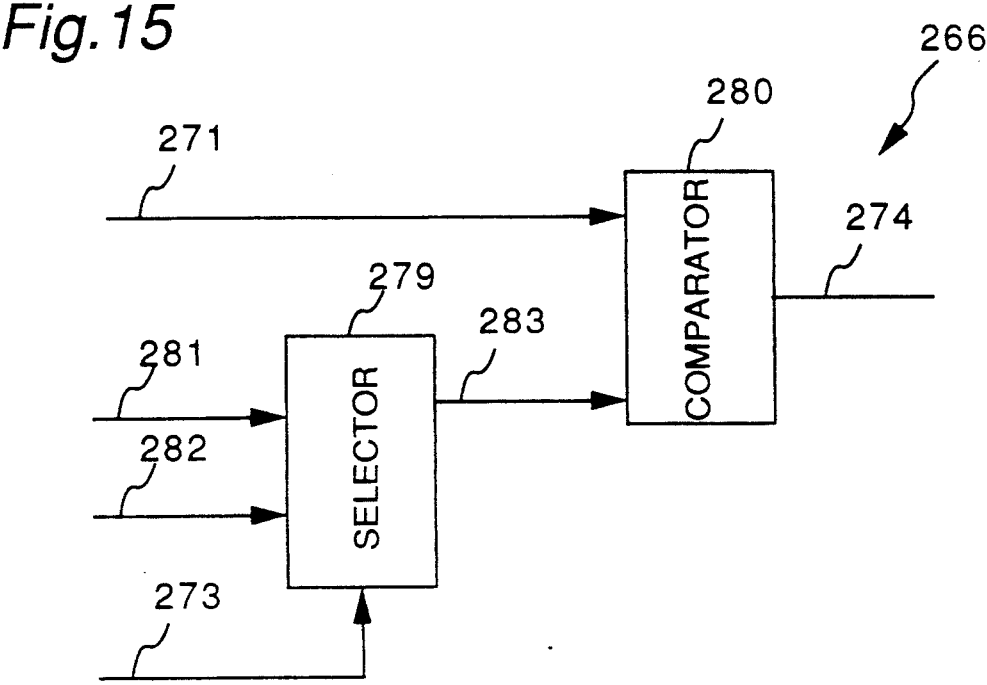
FIG. 15 is a block diagram of a noise classification circuit of an embodiment according to the present invention.

FIG. 15 shows an example of a circuit arrangement of the noise classification means 266.

Referring to FIG. 15, the noise classification circuit 266 comprises a selector 279 and a comparator 280. The selector 279 selects either one of two thresholds 281 and 282 according to the noise discrimination data 273 output from the first noise discrimination means 265. The data 273 is obtained by changing the block dividing method in the first noise discrimination means 265. A threshold 283 selected by the selector 279 is input to the comparator 280 where the input threshold 283 is compared with the image data 271. The comparator 280 outputs a high-level signal 274 when the image data 271 is smaller than the selected threshold 283.

Although the discrimination result of the first noise discrimination means 265 is used in the example shown in FIG. 15, the noise classification may be performed only with the image data 271.

FIG. 8 (c) shows an example of a circuit arrangement of the second noise discrimination means 269.

The second noise discrimination circuit 269 shown in FIG. 8 (c) is composed of a NOT element 284, an OR element 285, and an AND element 286. The AND element 286 outputs a high-level signal to the signal line 277 only when the signal line 272 represents the high level and the signal line 288 represents the high level. In order to make the OR element 285 output a high-level signal, either the condition where the signal line 274 represents the high level or the condition where the signal line 275 represents the low level must be satisfied. In other words, in order to make the AND element 286 output a high-level signal (indicating that the attentional pixel is a noise), the attentional pixel must not be existing in the information area, or the noise classification data 274 output from the noise classification means 266 must represents the high level (indicating that the information area data 275 is ignored) even when the attentional pixel is existing in the information area, and the output of the first noise discrimination means 265 regards the attentional pixel as a noise.

Figure 16:
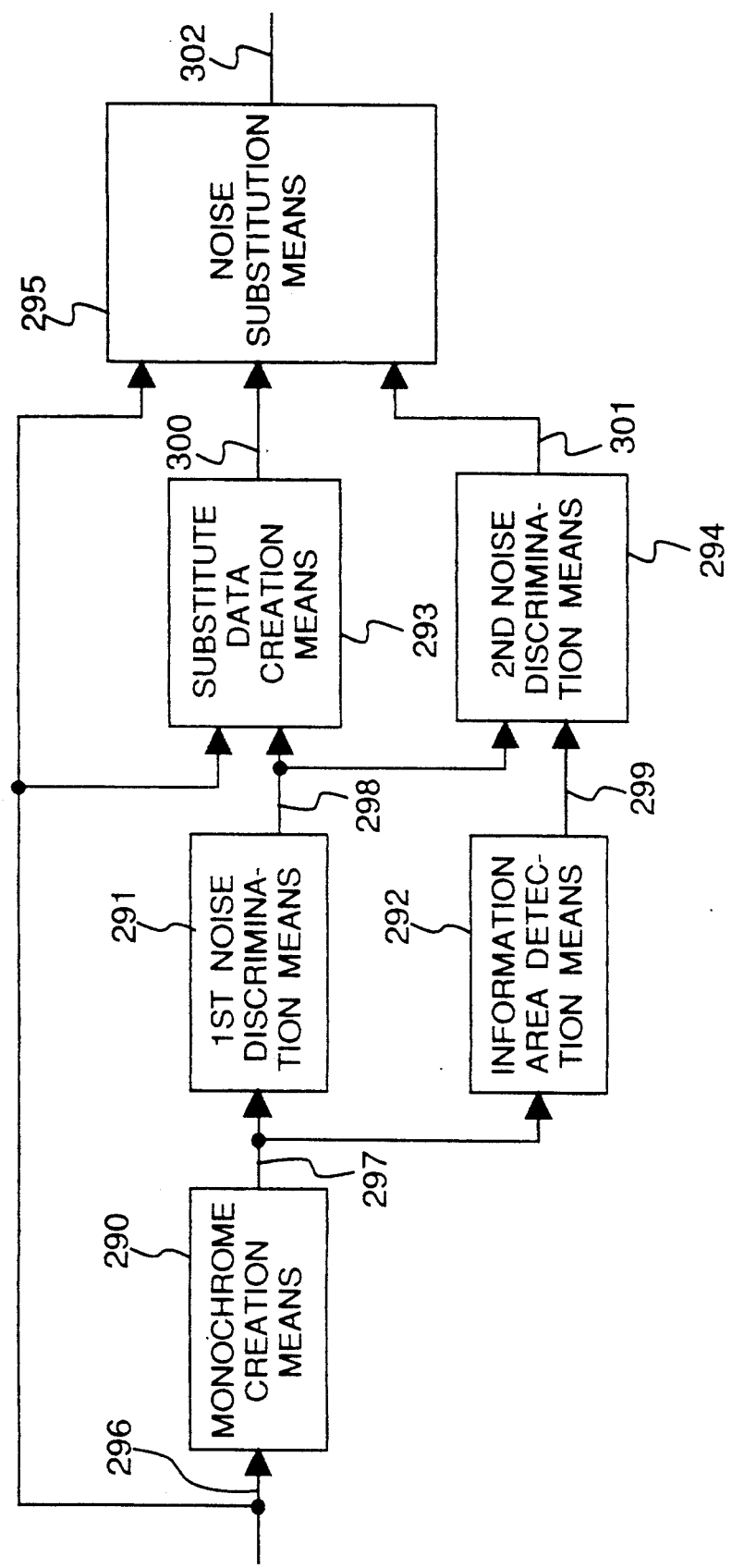
FIG. 16 is a block diagram of a noise elimination apparatus according to a fifth embodiment of the present invention.

FIG. 16 shows a noise elimination apparatus in accordance with a fifth embodiment of the present invention (referred to as "fifth noise elimination apparatus" hereinafter).

The fifth noise elimination apparatus adopted for color image processing as well as monochrome image comprises monochrome creation means 290, first noise discrimination means 291, information area detection means 292, substitute data creation means 293, second noise discrimination means 294, and noise substitution means 295.

The following describes the operation of the fifth noise elimination apparatus with reference to FIG. 16.

First, color image data 296 is converted into monochrome data in the monochrome creation means 290. Monochrome color data 297 output from the monochrome creation means 290 is simultaneously input to the first noise discrimination means 291 and information area detection means 292. The first noise discrimination means 291 roughly discriminates noise components included in the monochrome data. Since much erroneous discrimination may be accepted in this stage, noise components are detected as much as possible. The information area detection means 292 discriminates necessary image information such as a character and a picture in the monochrome data and detects the areas of the necessary information. First noise discrimination data 298 (noise pixel information) detected by the first noise discrimination means 291 is input to the second noise discrimination means 294 where the input data 298 is partially masked according to information area data 299 detected by the information area detection means 292. In other words, the second noise discrimination means 294 does not regard the first noise discrimination data 298 existing in the information area as noise no matter whether the data is noise or not. With the above-mentioned arrangement, it becomes possible to prevent deterioration of image quality due to noise elimination of image information such as a character and a picture existing in the information area.

Meanwhile, the substitute data creation means 293 creates substitute data to be substituted for a noise pixel according to the color image data 296 and the first noise discrimination data 298. Since the first noise discrimination data 298 is used for creating the substitute data, possible influence due to noise on the substitute data is eliminated. The noise substitution means 295 substitutes substitute data 300 output from the substitute data creation means 293 for the pixel regarded as noise by second noise discrimination data 301 output from the second noise discrimination means 294.

With the above-mentioned operations, noise elimination of image data can be performed. The fifth noise elimination apparatus differs from the second noise elimination apparatus chiefly in that the fifth apparatus has the monochrome creation means 290, which makes it possible to manage not only monochrome data but also color image data without any significant modification. By providing the monochrome creation means 290, the first noise discrimination means 291, the information area detection means 292, and the second noise discrimination means 294 are not required to be performed for each color for the prevention of increase of circuit scale to cope with color image.

In regard of the fifth noise elimination apparatus, the first noise discrimination means 291, information area detection means 292, and the second noise discrimination means 294 can be provided by the same circuits as those of the second noise elimination apparatus shown in FIGS. 4, 6, and 8. It is noted that the substitute data creation means 293 can be modified to have a circuit construction capable of creating substitute data for each color instead of monochrome. There may be used, for example, a method of adding up pixels which are discriminated as non-noise in the first noise discrimination means 291 in each color so as to obtain the average of the pixels. The noise substitution means 295 may be so constructed as to replace the pixels discriminated as noise by the second noise discrimination means 294 in each color.

Figure 17:
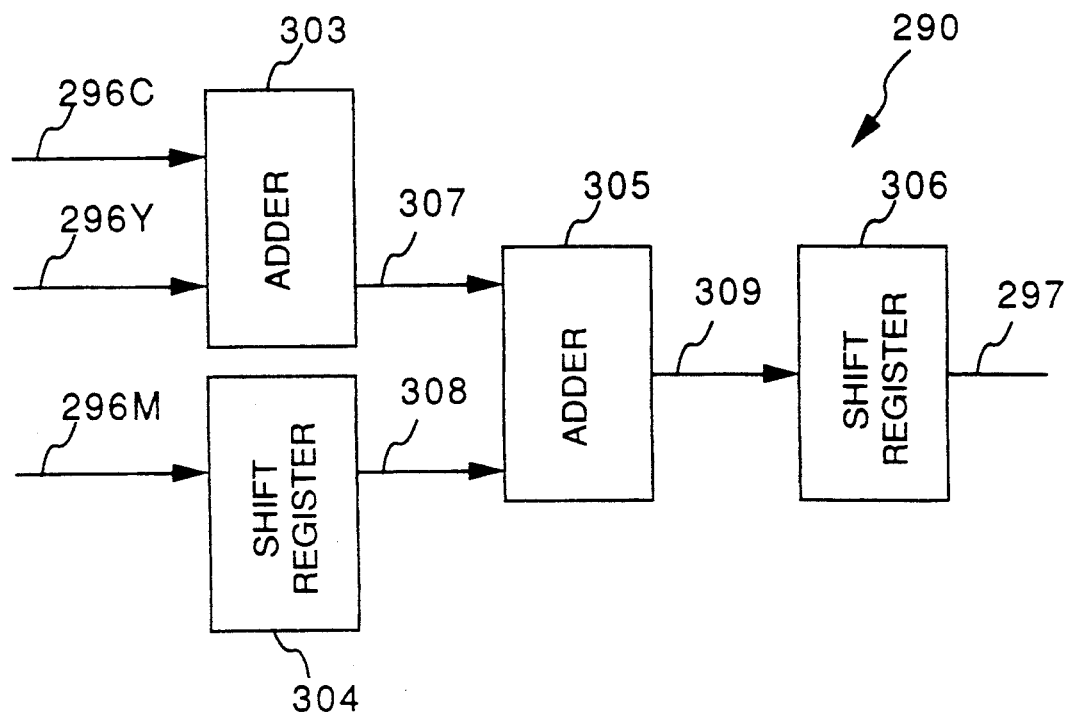
FIG. 17 is a block diagram of a monochrome creation circuit of an embodiment according to the present invention.

FIG. 17 shows an example of a circuit arrangement of the monochrome creation means 290.

Referring to FIG. 17, the monochrome creation circuit 290 comprises adders 303 and 305, and shift registers 304 and 306. Color image data 296 input to the monochrome creation means 290 may be reflectance data of red (R), green (G), and blue (B), or density data of cyan (C), magenta (M), and yellow (Y), or the like. In this embodiment, reference is made to the density data of cyan, magenta, and yellow. In the embodiment shown in FIG. 17, the monochrome data 297 is created according to the equation of $(C+2M+Y)/4$.

First, cyan data 296C and yellow data 296Y are added up in the adder 303, and then magenta data 296M is doubled. Assuming now that the data to be processed is binary data, the data can be doubled by being shifted upward by one bit in the shift register 304. The adder 305 adds up output data 307 of the adder 303 and output data 308 of the shift register 304. The resulting data 309 of the adder 305 is reduced to on fourth in the shift register 306 by shifting the data downward by two bits, so that the monochrome data 297 can be created. It is noted that the multiplication and subtraction operations of the data are performed by means of the shift registers for explanation purpose, the same operation can be attained by practically providing the signal lines 296M and 309 shifted by necessary amount of bits without providing the shift registers.

Figure 18:
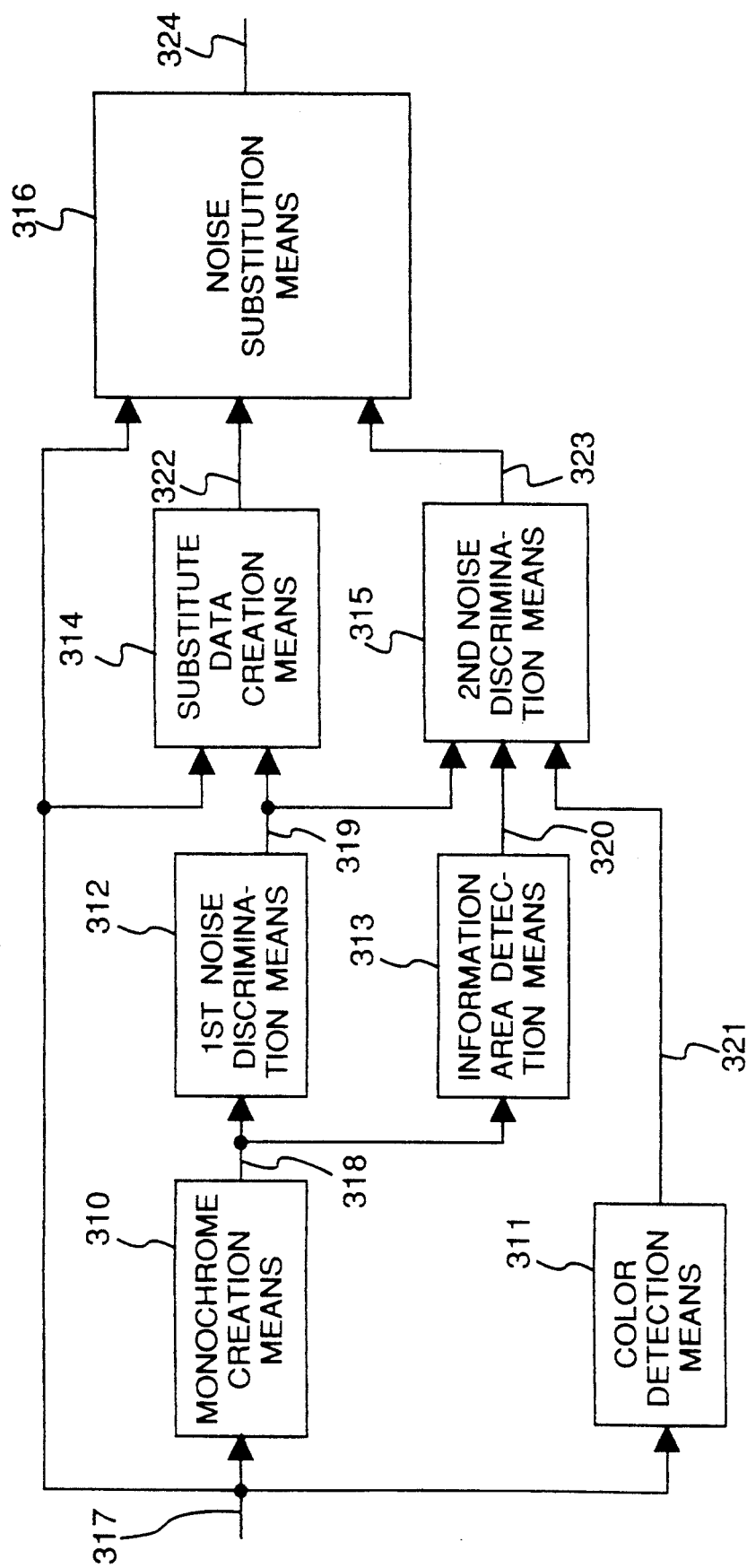
FIG. 18 is a block diagram of a noise elimination apparatus according to a sixth embodiment of the present invention.

FIG. 18 shows a noise elimination apparatus in accordance with a sixth embodiment of the present invention (referred to as "sixth noise elimination apparatus" hereinafter).

The sixth noise elimination apparatus comprises monochrome creation means 310, color detection means 311, first noise discrimination means 312, information area detection means 313, substitute data creation means 314, second noise discrimination means 315, and noise substitution means 316.

The following describes the operation of the sixth noise elimination apparatus with reference to FIG. 18.

First, color image data 317 is converted into monochrome data by the monochrome creation means 310. Monochrome data 318 output from the monochrome creation means 310 is simultaneously input to the first noise discrimination means 312 and information area detection means 313. The first noise discrimination means 312 roughly discriminates noise components in the monochrome data 318. Since much erroneous discrimination may be accepted in this stage, noise components are detected as much as possible. The information area detection means 313 discriminates necessary image information such as a character and a picture and detects the area of the necessary information. The color image data 317 is also input to the color detection means 311. The color detection means 311 detects the color of each pixel of the color image data 317 to judge whether the color of each pixel represents a noise color. First noise discrimination data 319 (noise pixel information) detected by the first information area detection means 312 is partially masked in the second noise discrimination means 315 according to information area data 320 detected by the information area detection means 313 and color data 321 output from the color detection means 311. In other words, a pixel is regarded as non-noise in the second noise discrimination means 315 in the case where the pixel is existing in the information area or represents non-noise color even when the pixel is discriminated as noise in the first noise discrimination means 312.

Meanwhile, the substitute data creation means 314 creates substitute data 322 to be substituted for noise pixel data according to the color image data 317 and first noise discrimination data 319. By using the first noise discrimination data 319 for creating the substitute data 322, possible influence due to noise on the resulting substitute data can be eliminated. Then, in the noise substitution means 316, each pixel discriminated as noise represented by second noise discrimination data 323 output from the second noise discrimination means 315 is replaced by the substitute data 322 output from the substitute data creation means 314.

With the above-mentioned arrangement, noise elimination of image data can be performed. The present apparatus according to the sixth embodiment differs from the fifth noise elimination apparatus chiefly in that, the sixth apparatus has the color detection means 311, which makes it possible to reduce erroneous discrimination of noise in the color image data 317. When creating the monochrome data 318 from the color image data 317 in the monochrome creation means 310, a slim and thin color such as a character tends to be converted into monochrome data having a small value. Therefore, it is highly possible that the monochrome data will be erroneously discriminated as noise, so that the data may not be protected only by the information area detection means 313. By providing the color detection means 311 to limit the noise color, the possible erroneous discrimination of noise can be prevented thereby to improve the image quality.

In regard of the sixth noise elimination apparatus as shown in FIG. 18, the monochrome creation means 310, the first noise discrimination means 312, the information area detection means 313, the substitute data creation means 314, and the noise substitution means 316 can be provided by the same circuits as those of the fifth noise elimination apparatus.

Figure 19:
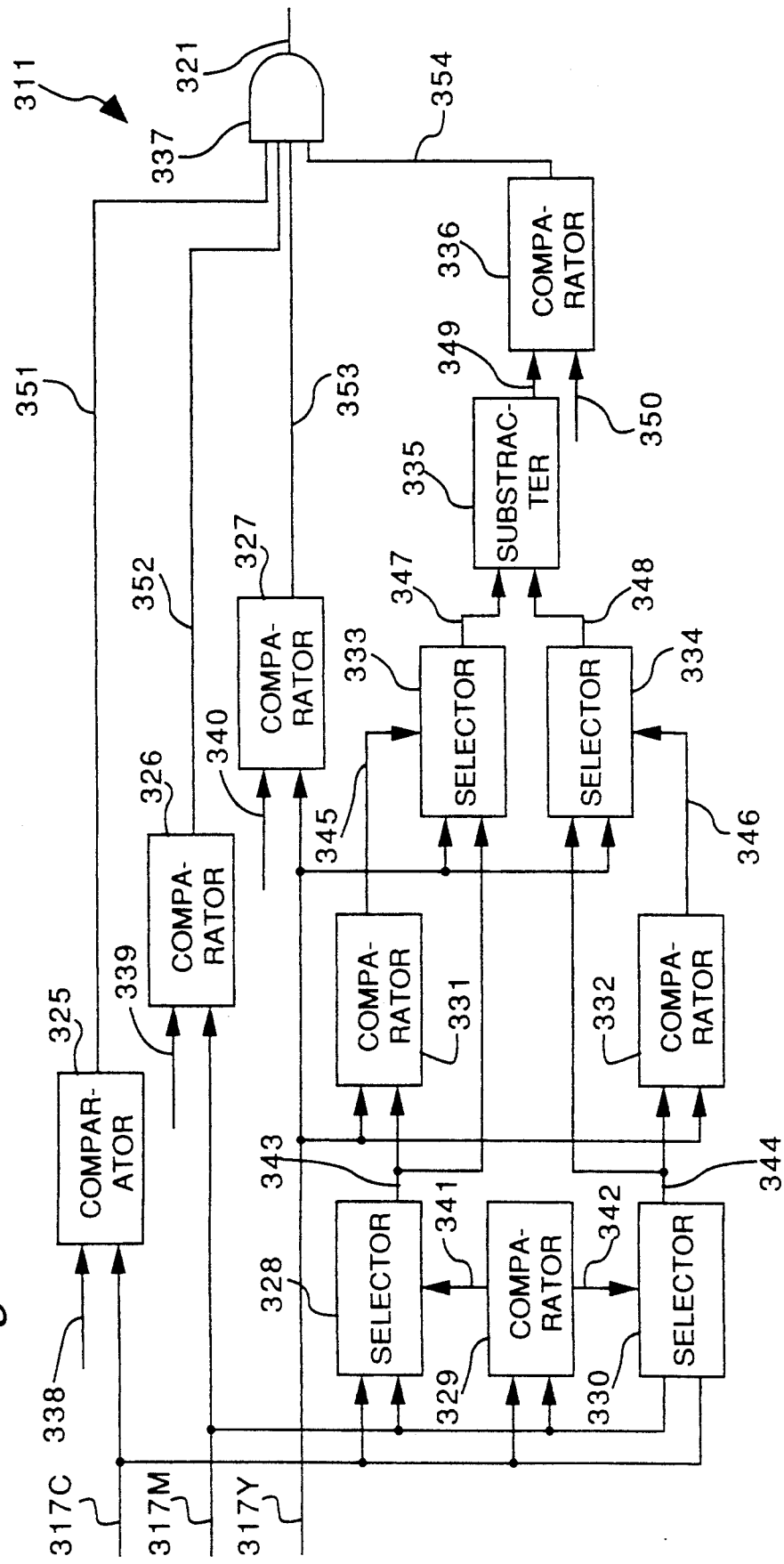
FIG. 19 is a block diagram of a color detection circuit of an embodiment according to the present invention.

FIG. 19 shows an example of a circuit arrangement of the color detection means 311.

Referring to FIG. 19, the color detection circuit 311 comprises comparators 325, 326, 327, 329, 331, 332, and 336, selectors 328, 330, 333, and 334, a subtracter 335, and an AND element 337.

In the color detection circuit 311 of the present sixth embodiment, an attentional pixel is regarded as noise color when the value of each of all the colors of cyan, magenta, and yellow is greater than a prescribed threshold, and when the maximum and minimum values of cyan, magenta, and yellow are detected and the difference between the detected maximum and minimum values is smaller than a prescribed threshold value.

The following describes the operation of the color detection circuit 311 with reference to FIG. 19. First, cyan image data 317C is input to the comparator 325 to be compared with a prescribed threshold 338. When the cyan image data 317C is greater than the threshold 338, the comparator 325 outputs a high-level signal 351. In the same manner, magenta image data 317M and yellow image data 317Y are respectively input to the comparators 326 and 327 to be compared with thresholds 339 an 340.

Meanwhile, the cyan image data 317C and the magenta image data 317M are input to the comparator 329 to be compared with each other, so that the comparator outputs two comparison results 341 and 342. According to a comparison result 341 of the comparator 329, the selector 328 selects the greater one of the cyan image data 317C and the magenta image data 317M to output the selected signal 343.

Meanwhile, according to a comparison result 342 of the comparator 329, the selector 330 selects the smaller one of the cyan image data 317C and the magenta image data 317M and outputs the selected smaller signal 344. The output data 343 of the selector 328 is input to the comparator 331 to be compared with the yellow image data 317Y. According to a comparison result 345, the selector 333 selects the greater one of the data 343 and the yellow image data 317Y and outputs the selected greater signal 347.

Meanwhile, the output data 344 of the selector 330 is input to the comparator 332 to be compared with the yellow image data 317Y. According to a comparison result 346 of the selector 332, the selector 334 selects the smaller one of the data 344 and the yellow image data 317Y and outputs the selected smaller signal 348. The subtracter 335 subtracts the value of the output data 348 of the selector 334 from the value of the output data 347 of the selector 333 to obtain the difference between the maximum value and the minimum value so as to obtain the resulting difference data 349. The comparator 336 compares the difference data 349 with a prescribed threshold 350. When the difference 349 is not greater than the threshold 350, the comparator 336 outputs a high-level signal 354.

The AND element 337 outputs a high-level signal 321 only when all the input signals 351, 352, 353, and 354 represent the high level. When the output of the AND element 337 represents the high level, the attentional pixel is regarded as noise color.

It is noted that the color detection circuit 311 is not limited to the arrangement and a variety of methods such as obtaining color difference from a reference color may be employed.

FIG. 8 (d) shows an example of a circuit arrangement of the second noise discrimination means 315.

The second noise discrimination circuit 315 as shown in FIG. 8 (d) comprises a NOT element 355 and an AND element 356. The AND element 356 outputs a high-level signal (which represents that the attentional pixel is noise) only when the first noise discrimination data 319 output from the first noise discrimination means 312 is in a high level and the information area detection data 320 output from the information area detection means 313 is in a low level and the color data 321 output from the color detection means 311 is in a high level. In other words, among the data 319 discriminated as noise by the first noise discrimination means 312, only the pixel which is regarded as noise color and not included in the information area is discriminated as noise by the second noise discrimination means 315.

Figure 20:
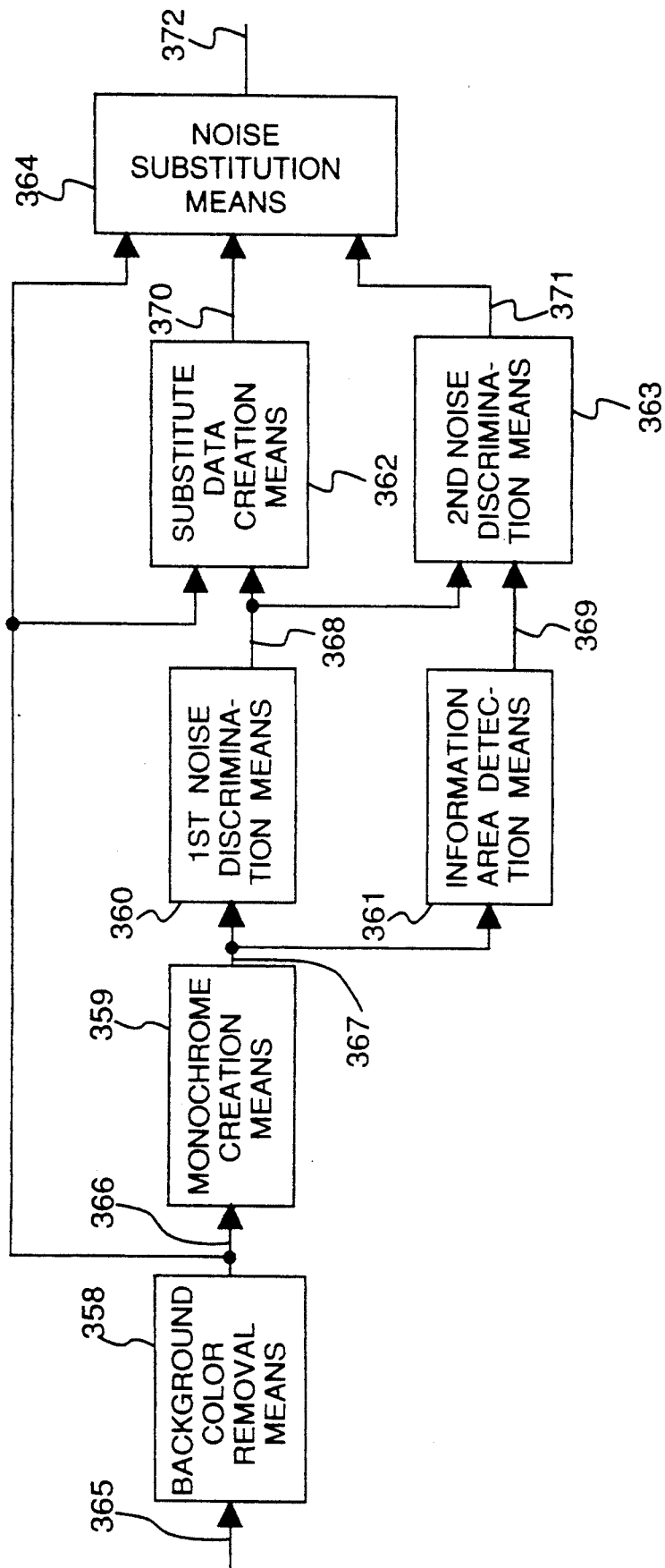
FIG. 20 is a block diagram of a noise elimination apparatus according to a seventh an embodiment of the present invention.

FIG. 20 shows a noise elimination apparatus in accordance with a seventh embodiment of the present invention (referred to as "seventh noise elimination apparatus" hereinafter).

The seventh noise elimination apparatus comprises background color removal means 358, monochrome creation means 359, first noise discrimination means 360, information area detection means 361, substitute data creation means 362, second noise discrimination means 363, and noise substitution means 364.

The following describes the operation of the seventh noise elimination apparatus with reference to FIG. 20.

First, color image data 365 is input to the background color removal means 358 to remove background color from the color image data 365. Color image data 366 output from the background color removal means 358 is converted into monochrome data 367 by the monochrome creation means 359. The monochrome data 367 output from the monochrome creation means 359 is input to the first noise discrimination means 360 where noise components in the monochrome data are roughly discriminated. Since much erroneous discrimination may be accepted in this stage, noise components are detected as much as possible. The monochrome data 367 is simultaneously input to the information area detection means 361 where necessary image information such as a character and a picture is discriminated and the area of the necessary information is also detected.

Meanwhile, first noise discrimination data 368 (i.e., noise pixel information) detected by the first information area detection means 360 is partially masked by the second noise discrimination means 363 according to information area data 369 detected by the information area detection means 361. In other words, an attentional pixel is not regarded as noise in the second noise discrimination means 363 so long as the pixel is existing in the information area even when the pixel is discriminated as noise in the first noise discrimination means 360.

Meanwhile, the substitute data creation means 362 creates substitute data to be substituted for a noise pixel using the color image data 366 and the first noise discrimination data 368. By using the first noise discrimination data 368 in creating the substitute data, the possible influence from noise on the substitute data can be eliminated. The noise substitution means 364 substitutes the substitute data 370 output from the substitute data creation means 362 for the pixel data regarded as noise according to second noise discrimination data 371 output from the second noise discrimination means 363.

With the above-mentioned arrangement, noise elimination of image data can be performed. The seventh noise elimination apparatus differs from the fifth noise elimination apparatus chiefly in that, the seventh apparatus has the background color removal means 358 which makes it possible to remove low-density noise around high-density noise to allow the high-density noise to be made conspicuous. The above-mentioned arrangement allows to simplify threshold adjustment and other operations (particularly adjustment of threshold for the data conversion into bi-level data and selection of scanning window size in the first noise discrimination means 360) in the subsequent stages to thereby improve discrimination rate of high-density noise. In the seventh noise elimination apparatus, not only high-density noise but also low-density noise can be eliminated, and therefore noise elimination capability is improved to obtain a high-quality image.

In regard of the seventh noise elimination apparatus, the monochrome creation means 359, the first noise discrimination means 360, the information area detection means 361, the substitute data creation means 362, the second noise discrimination means 363, and the noise substitution means 364 can be provided by the same circuits as those of the fifth noise elimination apparatus.

Figure 21:
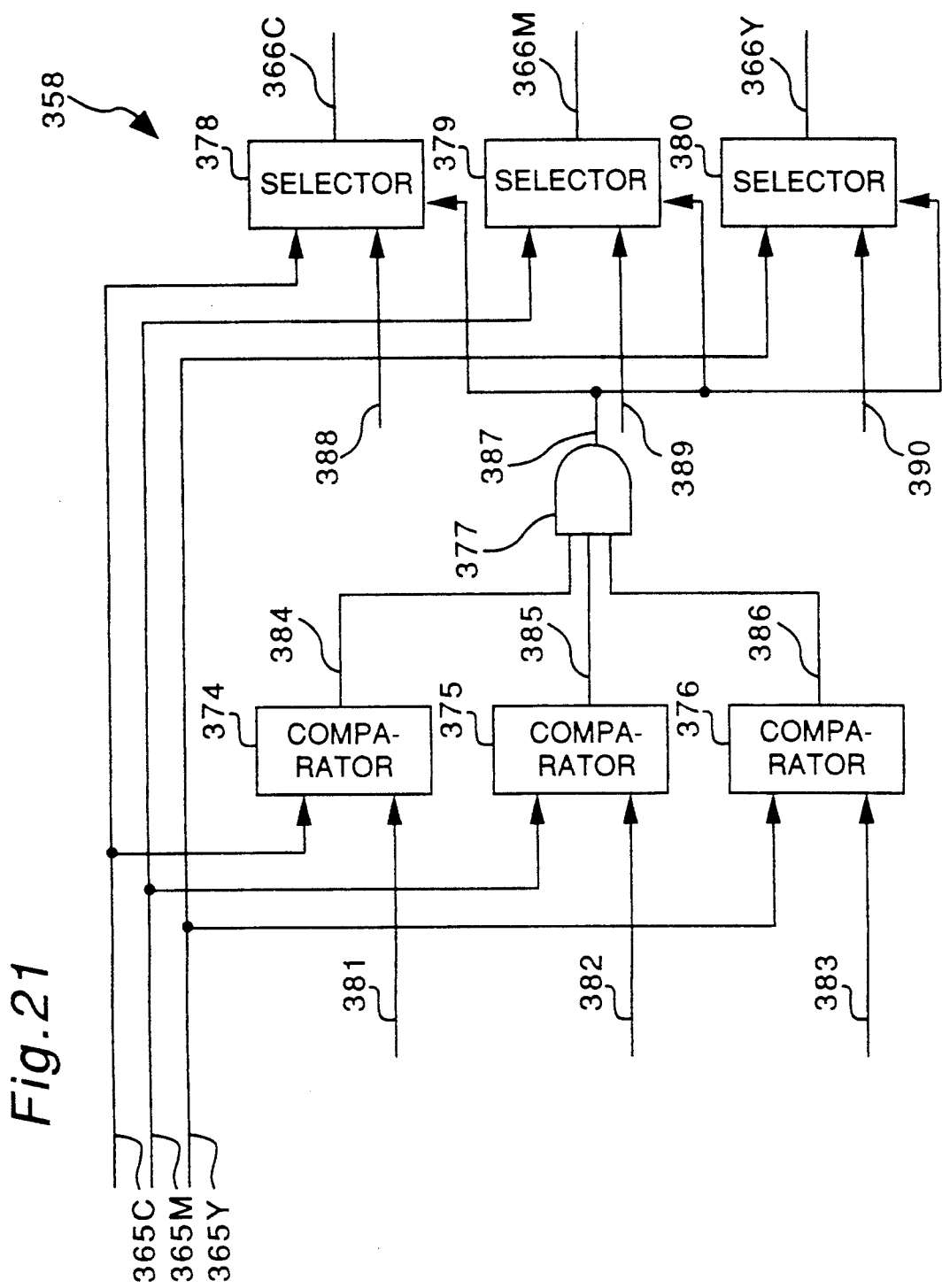
FIG. 21 is a block diagram of a background color removal circuit of an embodiment according to the present invention.

FIG. 21 shows an example of a circuit arrangement of the background color removal means 358.

The background color removal circuit 358 shown in FIG. 21 comprises comparators 374 through 376, an AND element 377, and selectors 378 through 380.

The background color removal circuit 358 of the present seventh embodiment removes each attentional pixel regarded as background color only when the density level in every color of the attentional pixel is smaller than a prescribed threshold. It is noted that the background color removal method is not limited to the present method.

The following describes the operation of the background color removal circuit 358 with reference to FIG. 21.

First, cyan image data 365C is compared with a threshold 381 by the comparator 374. When the density value of the cyan image data 365C is smaller than the threshold 381, the comparator 374 outputs a high-level signal 384. In the same manner, magenta image data 365M is compared with a threshold 382 by the comparator 375. When the density value of the magenta image data 365M is smaller than the threshold, the comparator 375 outputs a high-level signal 385. The same operation is performed for the yellow image data 365Y. The result of comparison with a threshold 383 is output from the comparator 376.

The AND element 377 outputs a high-level signal 387 only when all the input signals 384, 385, and 386 are high-level signals. In other words, the AND element 377 outputs the high-level signal when the density value of each of all the color data 365C, 365M, and 365Y is smaller than the thresholds 381, 382, and 383 respectively. When the AND element 377 outputs the high-level signal, the selector 378 selects data 388 to be output as an output signal 366C. Conversely, when the AND element 377 outputs a low-level signal, the selector 378 selects the cyan image data 365C to be output as the resulting data 366C. In the same manner, the selector 379 selects either one of the magenta image data 365M or data 389 according to the output data 387 of the AND element 377 to output the resulting data 366M. The selector 380 selects either one of the yellow image data 365Y or data 390 according to the output data 387 of the AND element 377 to output the resulting data 366Y. It is note that the data 388, 389, and 390 may have appropriate values such as a value "0" after removing background color.

The following describes in brief the first noise elimination apparatus shown in FIG. 1.

The first noise elimination apparatus is constructed by incorporating the noise classification means 5, the level noise extraction means 7 and the color detection means 3 in addition to the components of the seventh noise elimination apparatus. The noise classification means 5 can be provided by the same circuit as that shown in FIG. 15. The level noise extraction means 7 can be provided by the same circuit as that shown in FIG. 13. The noise classification means 5 and the level noise detection means 7 performs their respective processing operations using the monochrome data 13 output from the monochrome creation means 2. The resulting data 17 and 19 are output respectively and transmitted to the second noise discrimination means 9.

The color detection means 3 can be provided by the same circuit as that shown in FIG. 19. The color detection means 3 judges whether an attentional pixel is noise color or not according to the color image data 12 having the background color removed through the background color removal means 1. The judgment resulting data 14 output from the color detection means 3 is applied to the second noise discrimination means 9.

FIG. 8 (e) shows a example of a circuit arrangement of the second noise discrimination means 9.

The second noise discrimination circuit shown in FIG. 8 (e) comprises a NOT element 391, an OR element 392, and an AND element 393.

An output signal 21 of the AND element 393 represents a high-level (i.e., representing noise) only when all the input data 15, 19, 14, and 395 represent the high level. The signal 395 represents high level when at least either a signal 17 which is input to the OR element 392 or a signal 394 is in a high level. The signal 394 is inverted to high level when an input signal 18 of the NOT element 391 represents a low level. In other words, the AND element 393 outputs the high-level signal under the condition that, an attentional pixel (not shown) is discriminated as noise in the first noise discrimination means 4, and that the density value of the attentional pixel is on a level to be eliminated by the level noise detection means 7, and that the attentional pixel is discriminated as noise color by the color detection means 3, and that the signal 395 represents the high level. The signal 395 represents the high level in the case where the attentional pixel is discriminated to be not included in the information area by the information area detection means 6 or in the case where the information area data 18 is determined to be a pixel to be ignored by the noise classification means 5 even if the attentional pixel is included in the information area.

With the above-mentioned arrangement, any noise elimination apparatus of the present invention can discriminate noise having a higher density to allow the noise to be eliminated without blurring image edges, which enables the obtainment of an image having a higher quality than the conventional noise elimination apparatus.

It is noted that latches for timing adjustment, clock lines, and others are eliminated in either of the embodiments. The line memories for each processing may be commonly used.

Although the density data of cyan, magenta, and yellow are used as color image data in each of the above-mentioned embodiments, the reflectance data of red, green, and blue may be used instead.

Without providing the substitute data creation means 8, 25, 244, 268, 293, 314, and 362, merely a specific value (density value "0", for example) may substitute for noise.

Although the present invention has been fully described by way of example with reference to the accompanying drawings, it is to be noted here that various changes and modifications will be apparent to those skilled in the art. Therefore, unless otherwise such changes and modifications depart from the scope of the present invention as defined by the appended claims, they should be construed as included therein.

What is claimed is:

1. A noise elimination apparatus comprising:
   first noise discrimination means for discriminating first noise components in image data;
   information area detection means for detecting an area of necessary information in the image data;
   second noise discrimination means for discriminating second noise components according to first noise discrimination data output from said first noise discrimination means and information area data output from said information area detection means;
   substitute data creation means for creating substitute data to be substituted for second noise discrimination data output from said second noise discrimination means using the image data and the first noise discrimination data output from said first noise discrimination means; and
   noise substitution means for substituting substitute data output from said substitute data creation means for the second noise discrimination data output from said second noise discrimination means.

2. The noise elimination apparatus as claimed in claim 1 further comprising level noise extraction means for extracting data having a specified level among the image data, the resultant output extraction data being input to said second noise discrimination means.

3. The noise elimination apparatus as claimed in claim 1 further comprising noise classification means for determining whether information area data output from said information area detection means is to be ignored according to at least one of the image data and first noise discrimination data output from said first noise discrimination means, the resultant output noise classification data being input to said second noise discrimination means.

4. The noise elimination apparatus as claimed in claim 1 further comprising monochrome creation means for converting color image data into monochrome data, the resultant output monochrome data being simultaneously input to said first noise discrimination means and to said information area detection means.

5. The noise elimination apparatus as claimed in claim 4 further comprising color detection means for detecting the color of the color image data, the resultant output color data being input to said second noise discrimination means.

6. The noise elimination apparatus as claimed in claim 4 further comprising background color removal means for removing background color from color image data.

7. The noise elimination apparatus as claimed in claim 6 further comprising color detection means for detecting the color of the color image data output from said background color removal means to output the color data to said second noise discrimination means.

8. The noise elimination apparatus as claimed in claim 4 further comprising level noise extraction means for extracting data having a specified level among the monochrome data output from said monochrome creation means so as to input the resulting level noise extraction data to said second noise discrimination means.

9. The noise elimination apparatus as claimed in claim 4 further comprising noise classification means for determining whether the information area data output from said information area detection means is to be ignored according to at least one of the monochrome data output from said monochrome creation means and the first noise discrimination data output from said first noise discrimination means so as to input the resulting data to said second noise discrimination means.

10. The noise elimination apparatus as claimed in claim 1, wherein said first noise discrimination means comprises first bi-level converter means.

11. The noise elimination apparatus as claimed in claim 4, wherein said first noise discrimination means comprises first bi-level converter means.

12. The noise elimination apparatus as claimed in claim 1, wherein said first noise discrimination means divides a first scanning window for scanning image data into a plurality of blocks, and detects a block which includes a number greater than a second threshold value of pixels each of which level exceeds the level of an attentional pixel by a first threshold, and checks the arrangement shape of the block in the first scanning window, and discriminates the attentional pixel as noise when the arrangement shape of the block coincides with a specified first shape.

13. The noise elimination apparatus as claimed in claim 4, wherein said first noise discrimination means divides a first scanning window for scanning image data into a plurality of blocks, and detects a block which includes a number greater than a second threshold value of pixels each of which level exceeds the level of an attentional pixel by a first threshold, and checks the arrangement shape of the block in the first scanning window, and discriminates the attentional pixel as noise when the arrangement shape of the block coincides with a specified first shape.

14. The noise elimination apparatus as claimed in claim 1, wherein said information area detection means comprises second bi-level converter means.

15. The noise elimination apparatus as claimed in claim 4, wherein said information area detection means comprises second bi-level converter means.

16. The noise elimination apparatus as claimed in claim 1, wherein said information area detection means divides a second scanning window for scanning image data into a plurality of blocks, and checks the arrangement shape of a block which includes a number greater than a fourth threshold of pixels each of which level exceeds a third threshold, and makes a judgment that the attentional pixel is existing in the information area when the arrangement shape of the block coincides with a specified second shape.

17. The noise elimination apparatus as claimed in claim 4, wherein said information area detection means divides a second scanning window for scanning image data into a plurality of blocks, and checks the arrangement shape of a block which includes a number greater than a fourth threshold of pixels each of which level exceeds a third threshold, and makes a judgment that the attentional pixel is existing in the information area when the arrangement shape of the block coincides with a specified second shape.

* * * * *